US012651898B1

(12) United States Patent (10) Patent No.: US 12,651,898 B1
Almohammedi et al. (45) Date of Patent: Jun. 9, 2026

(54) METHOD AND SYSTEM FOR A COLLABORATIVE PROTECTION MASK FOR A WIDE AREA PROTECTION

(71) Applicant: King Fahd University of Petroleum and Minerals, Dhahran (SA)

(72) Inventors: Ali Mohammed Ahmed Almohammedi, Dammam (SA); Muhammad Suhail Hussain Shaik, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 19/344,129

(22) Filed: Sep. 29, 2025

(51) Int. Cl.
  *H02H 7/26* (2006.01)
  *H02H 1/00* (2006.01)
  *H02H 7/22* (2006.01)
(52) U.S. Cl.
  CPC ........... *H02H 7/26* (2013.01); *H02H 1/0007* (2013.01); *H02H 7/226* (2013.01)
(58) Field of Classification Search
  CPC ......... H02H 7/26; H02H 1/0007; H02H 7/226
  See application file for complete search history.

(56) References Cited

U.S. PATENT DOCUMENTS 11,271,389 B2 * 3/2022 Kasztenny ................ H02H 7/22
11,411,389 B1 * 8/2022 Chakrapani .............. H02H 3/40
(Continued)

FOREIGN PATENT DOCUMENTS

CN 106207998 A 12/2016
CN 113095578 B 9/2022

OTHER PUBLICATIONS

Seyed Ali Esmaeilzadeh Mousavi, et al., "Wide area backup protection scheme for distance relays considering the uncertainty of network protection", 21$^{st}$ Power Systems Computation Conference, Porto, Portugal: Jan. 29, 2020-Jul. 3, 2020 (8 pgs) (also published in Electric Power Systems Research, vol. 180, 106651, Dec. 2020).
(Continued)

*Primary Examiner* — Scott Bauer
(74) *Attorney, Agent, or Firm* — Oblon, McClelland, Maier & Neustadt, L.L.P.

(57) ABSTRACT

A method for a collaborative protection mask in a wide-area protection system is disclosed. The method comprises determining, in a first zone, whether a first pair of protection relays (R5, R6) detects a fault occurrence on a first line (L3) from a first activation mask (D$^I$) based on a first weighting factor. The method comprises determining, in the first zone, whether the first pair of protection relays detects the fault from a second activation mask (D$^{II}$) based on a second weighting factor, and determining, in a second zone, whether a second pair of protection relays (R3, R8) detects the fault from the second activation mask based on the second weighting factor. The method comprises determining detections from a third activation mask (D$^{III}$) using the first, second, and third pairs of relays (R1, R10), and performing one or more operations on the first pair of relays based on the collaborative determinations.

20 Claims, 22 Drawing Sheets

(56) References Cited

U.S. PATENT DOCUMENTS

| | | | |
|---|---|---|---|
| 2010/0254225 A1* | 10/2010 | Schweitzer, III | H04J 3/0641 |
| | | | 368/47 |
| 2012/0265360 A1* | 10/2012 | Smit | H02H 7/262 |
| | | | 700/293 |
| 2025/0165337 A1 | 5/2025 | Udren | |

OTHER PUBLICATIONS

Hamed Rezapour et al., "Wide-Area Protection System for Radial Smart Distribution Networks", Applied Sciences 2024, vol. 14, Issue 11, 4862, Jun. 4, 2024 (13 pgs).

Wang Yang, et al., "Wide-Area Intelligent Protection System Based on Genetic Algorithm", Istanbul University—Journal of Electrical and Electronics Engineering; vol. 9, No. 2, 2009 (7 pgs).

* cited by examiner

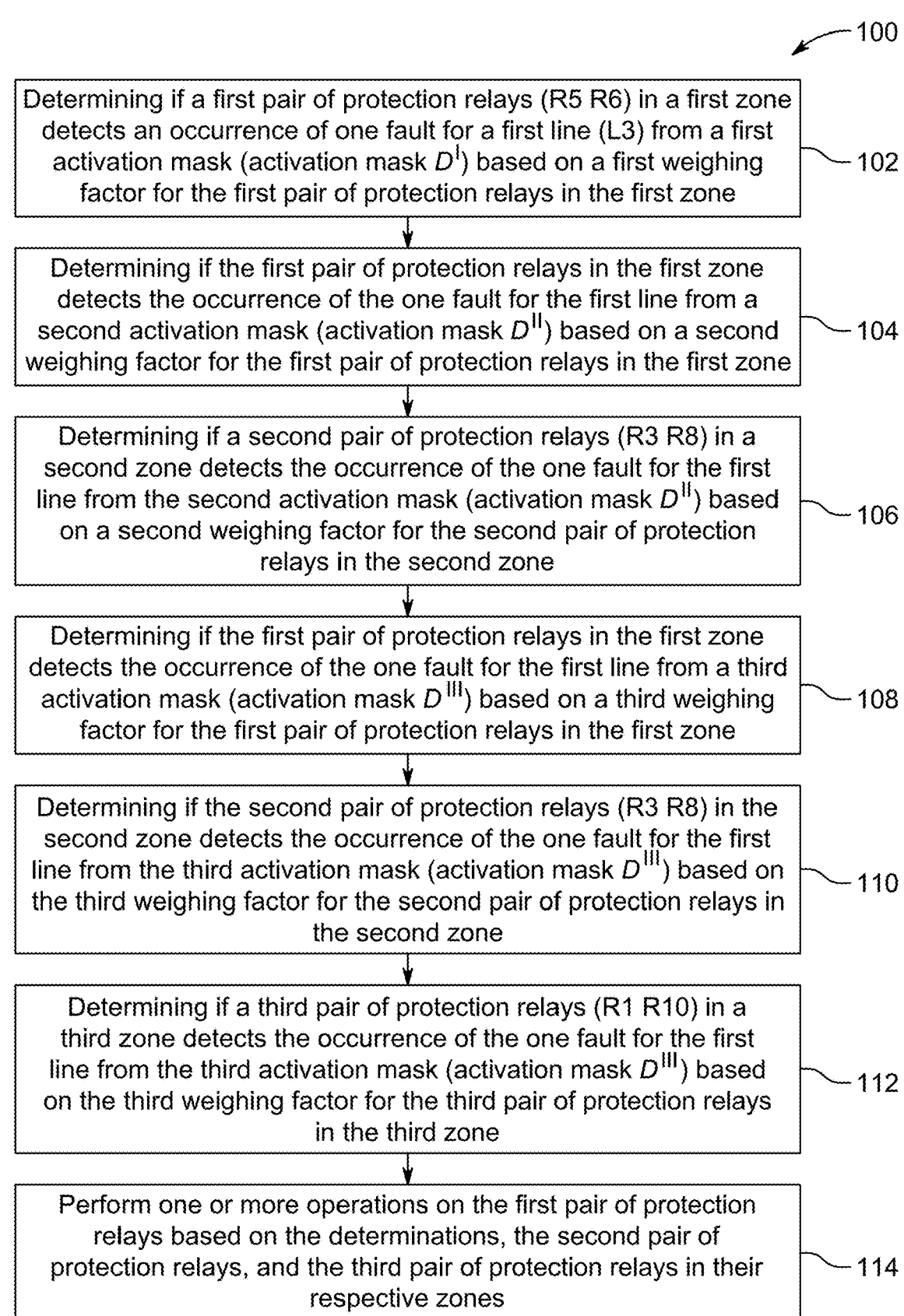

Determining if a first pair of protection relays (R5 R6) in a first zone detects an occurrence of one fault for a first line (L3) from a first activation mask (activation mask $D^{I}$) based on a first weighing factor for the first pair of protection relays in the first zone — 102

Determining if the first pair of protection relays in the first zone detects the occurrence of the one fault for the first line from a second activation mask (activation mask $D^{II}$) based on a second weighing factor for the first pair of protection relays in the first zone — 104

Determining if a second pair of protection relays (R3 R8) in a second zone detects the occurrence of the one fault for the first line from the second activation mask (activation mask $D^{II}$) based on a second weighing factor for the second pair of protection relays in the second zone — 106

Determining if the first pair of protection relays in the first zone detects the occurrence of the one fault for the first line from a third activation mask (activation mask $D^{III}$) based on a third weighing factor for the first pair of protection relays in the first zone — 108

Determining if the second pair of protection relays (R3 R8) in the second zone detects the occurrence of the one fault for the first line from the third activation mask (activation mask $D^{III}$) based on the third weighing factor for the second pair of protection relays in the second zone — 110

Determining if a third pair of protection relays (R1 R10) in a third zone detects the occurrence of the one fault for the first line from the third activation mask (activation mask $D^{III}$) based on the third weighing factor for the third pair of protection relays in the third zone — 112

Perform one or more operations on the first pair of protection relays based on the determinations, the second pair of protection relays, and the third pair of protection relays in their respective zones — 114

FIG. 1

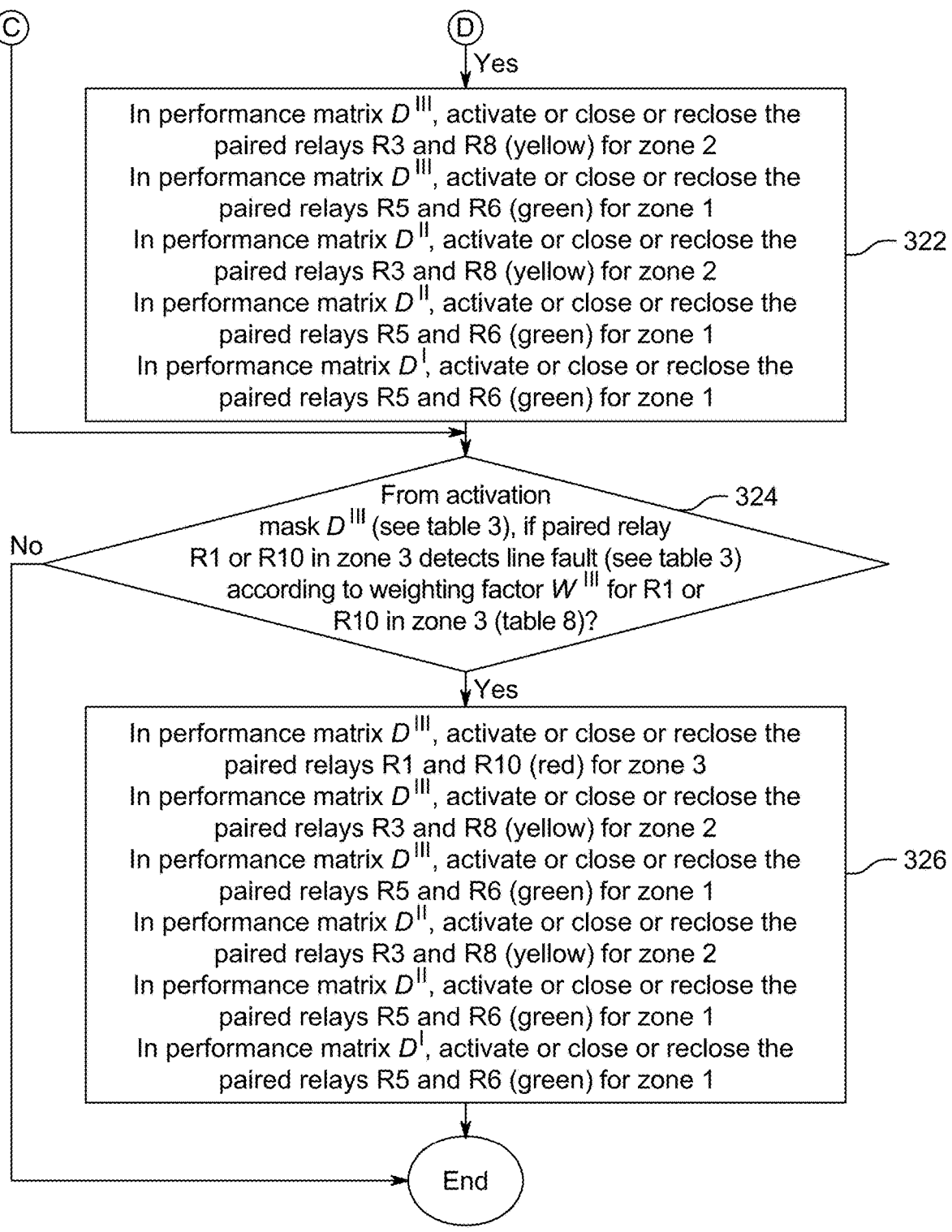

Ⓒ                    Ⓓ
                      ↓ Yes

In performance matrix $D^{III}$, activate or close or reclose the
paired relays R3 and R8 (yellow) for zone 2
In performance matrix $D^{III}$, activate or close or reclose the
paired relays R5 and R6 (green) for zone 1
In performance matrix $D^{II}$, activate or close or reclose the
paired relays R3 and R8 (yellow) for zone 2
In performance matrix $D^{II}$, activate or close or reclose the
paired relays R5 and R6 (green) for zone 1
In performance matrix $D^{I}$, activate or close or reclose the
paired relays R5 and R6 (green) for zone 1          — 322

From activation
mask $D^{III}$ (see table 3), if paired relay          — 324
R1 or R10 in zone 3 detects line fault (see table 3)
according to weighting factor $W^{III}$ for R1 or
R10 in zone 3 (table 8)?

No

↓ Yes

In performance matrix $D^{III}$, activate or close or reclose the
paired relays R1 and R10 (red) for zone 3
In performance matrix $D^{III}$, activate or close or reclose the
paired relays R3 and R8 (yellow) for zone 2
In performance matrix $D^{III}$, activate or close or reclose the
paired relays R5 and R6 (green) for zone 1
In performance matrix $D^{II}$, activate or close or reclose the
paired relays R3 and R8 (yellow) for zone 2
In performance matrix $D^{II}$, activate or close or reclose the
paired relays R5 and R6 (green) for zone 1
In performance matrix $D^{I}$, activate or close or reclose the
paired relays R5 and R6 (green) for zone 1          — 326

End

| | Line Number | | | | |
|---|---|---|---|---|---|
| | L1 | L2 | L3 | L4 | L5 |
| | Relay Number | | | | |
| | R1, R2 | R3, R4 | R5, R6 | R7, R8 | R9, R10 |
| **Zone 1 $D^{I*}$** | 0 | 0 | 1 | 0 | 0 |
| **Zone 1 $D^{I*}$** | 0 | 0 | 1 | 0 | 0 |
| Zone 2 $D^{II*}$ | 0 | 1 | 1 | 0 | 0 |
| Zone 2 $D^{II*}$ | 0 | 0 | 1 | 1 | 0 |
| Zone 3 $D^{III*}$ | 1 | 1 | 1 | 0 | 0 |
| Zone 3 $D^{III*}$ | 0 | 0 | 1 | 1 | 1 |

FIG. 11

| | Line Number | | | | |
| --- | --- | --- | --- | --- | --- |
| | L1 | L2 | L3 | L4 | L5 |
| | Relay Number | | | | |
| | R1, R2 | R3, R4 | R5, R6 | R7, R8 | R9, R10 |
| **Zone 1 $D^{I*}$** | 0 | 0 | 1 | 0 | 0 |
| **Zone 1 $D^{I*}$** | 0 | 0 | 1 | 0 | 0 |
| Zone 2 $D^{II*}$ | 0 | 1 | 1 | 0 | 0 |
| Zone 2 $D^{II*}$ | 0 | 0 | 1 | 1 | 0 |
| Zone 3 $D^{III*}$ | 0 | 1 | 1 | 0 | 0 |
| Zone 3 $D^{III*}$ | 0 | 0 | 1 | 1 | 0 |

FIG. 12

| | Line Number | | | | |
|---|---|---|---|---|---|
| | L1 | L2 | L3 | L4 | L5 |
| | Relay Number | | | | |
| | R1, R2 | R3, R4 | R5, R6 | R7, R8 | R9, R10 |
| Zone 1 $D^{I*}$ | 0 | 0 | 1 | 0 | 0 |
| Zone 1 $D^{I*}$ | 0 | 0 | 1 | 0 | 0 |
| Zone 2 $D^{II*}$ | 0 | 0 | 1 | 0 | 0 |
| Zone 2 $D^{II*}$ | 0 | 0 | 1 | 0 | 0 |
| Zone 3 $D^{III*}$ | 0 | 0 | 1 | 0 | 0 |
| Zone 3 $D^{III*}$ | 0 | 0 | 1 | 0 | 0 |

FIG. 13

| Line Number | L1 | L2 | L3 | L4 | L5 | L6 |
|---|---|---|---|---|---|---|
| Relay Number | R1, R2 | R3, R4 | R5, R6 | R7, R8 | R9, R10 | R11, R12 |
| **Zone 1 D$^{I*}$** | 0 | 1 | 0 | 0 | 0 | 0 |
| **Zone 1 D$^{I*}$** | 0 | 1 | 0 | 0 | 0 | 0 |
| Zone 2 D$^{II*}$ | 0 | 1 | 0 → 1 | 0 | 0 | 0 |
| Zone 2 D$^{II*}$ | 0 → 1 | 1 | 0 | 0 | 0 | 0 |
| Zone 3 D$^{III*}$ | 0 | 1 | 1 | 0 | 0 | 1 |
| Zone 3 D$^{III*}$ | 1 | 1 | 0 | 1 | 0 | 0 |

FIG. 14

| Line Number | L1 | L2 | L3 | L4 | L5 | L6 |
|---|---|---|---|---|---|---|
| Relay Number | R1, R2 | R3, R4 | R5, R6 | R7, R8 | R9, R10 | R11, R12 |
| **Zone 1 $D^{I*}$** | 0 | $0 \rightarrow 1$ | 0 | 0 | 0 | 0 |
| **Zone 1 $D^{I*}$** | 0 | $0 \rightarrow 1$ | 0 | 0 | 0 | 0 |
| Zone 2 $D^{II*}$ | 0 | $0 \rightarrow 1$ | 1 | 0 | 0 | 0 |
| Zone 2 $D^{II*}$ | $0 \rightarrow 1$ | $0 \rightarrow 1$ | 0 | 0 | 0 | 0 |
| Zone 3 $D^{III*}$ | 0 | 0 | 0 | 0 | 0 | 0 |
| Zone 3 $D^{III*}$ | 0 | 0 | 0 | 0 | 0 | 0 |

FIG. 15

| Line Number | L1 | L2 | L3 | L4 | L5 | L6 |
|---|---|---|---|---|---|---|
| Relay Number | R1, R2 | R3, R4 | R5, R6 | R7, R8 | R9, R10 | R11, R12 |
| Zone 1 $D^{I*}$ | 0 → 1 | 0 | 0 | 0 | 0 | 0 |
| Zone 1 $D^{I*}$ | 0 → 1 | 0 | 0 | 0 | 0 | 0 |
| Zone 2 $D^{II*}$ | 0 → 1 | 1 | 0 | 0 | 0 | 0 |
| Zone 2 $D^{II*}$ | 0 → 1 | 0 | 0 | 0 | 0 | 0 → 1 |
| Zone 3 $D^{III*}$ | 0 → 1 | 0 → 1 | 0 | 0 | 0 | 0 |
| Zone 3 $D^{III*}$ | 0 → 1 | 0 | 0 | 0 | 0 | 1 |

FIG. 16

METHOD AND SYSTEM FOR A COLLABORATIVE PROTECTION MASK FOR A WIDE AREA PROTECTION

STATEMENT OF DISCLOSURE BY AN INVENTOR

Aspects of the present disclosure are described in A. Almohammedia, S. M. S. Hussain, "Collaborative Genetic Algorithm for Wide-Area Backup Distance Protection under Uncertain Conditions," *Electric Power Systems Research* (2025) which is incorporated herein by reference in its entirety.

BACKGROUND

Technical Field

The present disclosure is directed to an autonomous decision-making approach for a collaborative protection mask for a wide area protection.

Description of Related Art

The background description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Power transmission networks have become increasingly complex, and ensuring reliable backup protection has emerged as a critical requirement for maintaining system stability. Distance relays are commonly used for fault detection and clearance due to their speed and efficiency. However, protection based solely on local distance relays can become unreliable under practical operating conditions. Issues such as communication delays, measurement errors, noise, or high fault impedance can result in misoperation or delayed clearance, thereby increasing the likelihood of failures within the network.

To mitigate these challenges, wide-area backup protection schemes have been introduced to operate alongside local relay protection. Wide-area schemes leverage system-level data, such as phasor measurements and remote relay status, in combination with high-speed communication links to provide a global view of the network. The wider perspective improves fault detection and isolation, serving as an additional safeguard during emergency events and blackout conditions.

Various wide-area backup protection methods have been studied. Certain approaches rely primarily on electrical measurements, such as voltages and currents, to make centralized trip decisions. Other approaches focus on the performance or operational status of protection devices, such as relays and circuit breakers, to identify the faulted line. Hybrid approaches integrate both electrical measurements and device performance information to enhance accuracy. While these techniques improve fault coverage compared with conventional local schemes, they introduce challenges related to large-scale data handling, synchronization requirements, and reliability under uncertain operating conditions.

Optimization-based methods, including genetic algorithms (GAs), have also been applied to wide-area backup protection. GA-based frameworks evaluate the performance of distance relays across multiple protection zones and determine weighting factors that optimize an objective function for fault identification. These methods have demonstrated strong fault detection accuracy under nominal operating conditions and illustrate the value of utilizing global system information. However, the reliability of GA-based schemes deteriorates when multiple uncertainties are present simultaneously. In scenarios involving high fault resistance, communication errors, or relay failures, the ability to consistently identify the correct faulted line is significantly reduced.

CN113095578B discloses a method and device for optimizing the communication path between a transformer substation, terminal, and medium, based on wide-area protection and information exchange between adjacent substations. The above-mentioned reference utilizes a multiservice transport platform (MSTP) network to exchange information and applies weighting to communication delay and maximum link utilization to establish a minimized mathematical model. However, the above-mentioned reference does not address collaborative coordination among multiple protection relays across zones when network uncertainties affect fault detection reliability.

CN106207998A discloses a protection system and method based on information fault tolerance. The above-mentioned reference integrates electrical quantity information of a substation with that of adjacent substations and performs a fault assessment using a genetic algorithm for preliminary fault determination. However, the above-mentioned reference does not consider coordinated activation of multiple pairs of relays distributed across different protection zones, which can be important in improving reliability under uncertain conditions Accordingly, there remains a need for a backup protection mechanism that can maintain high fault detection accuracy under worst-case conditions. Such a mechanism should provide enhanced resilience against uncertainties while enabling effective coordination among protection relays distributed across multiple zones of a power transmission network.

SUMMARY

In an exemplary embodiment, a method for collaborative protection mask for a wide area protection is disclosed. The method includes determining if a first pair of protection relays (R5 R6) in a first zone detects an occurrence of one fault for a first line (L3) from a first activation mask (activation mask $D^I$) based on a first weighing factor for the first pair of protection relays in the first zone. The method includes determining if the first pair of protection relays in the first zone detects the occurrence of the one fault for the first line from a second activation mask (activation mask $D^{II}$) based on a second weighing factor for the first pair of protection relays in the first zone. The method includes determining if a second pair of protection relays (R3 R8) in a second zone detects the occurrence of the one fault for the first line from the second activation mask (activation mask $D^{II}$) based on a second weighing factor for the for the second pair of protection relays in the second zone. The method includes determining if the first pair of protection relays in the first zone detects the occurrence of the one fault for the first line from a third activation mask (activation mask $D^{III}$) based on a third weighing factor for the first pair of protection relays in the first zone. The method includes determining if the second pair of protection relays (R3 R8) in the second zone detects the occurrence of the one fault for the first line from the third activation mask (activation mask $D^{III}$) based on the third weighing factor for the for the second pair of protection relays in the second zone. The method includes determining if a third pair of protection relays (R1 R10) in a third zone detects the occurrence of the one fault for the first line from the third activation mask (activation mask $D^{II}$) based on the third weighing factor for the for the third pair of protection relays in the third zone. The method includes performing one or more operations on the first pair of protection relays based on the determinations, the second pair of protection relays, and the third pair of protection relays in their respective zones.

In another exemplary embodiment, a collaborative protection mask for a wide area protection system is disclosed. The collaborative protection mask includes a first pair of protection relays (R5, R6) are positioned in a first zone (zone 1), over a first performance matrix, a second performance matrix, and a third performance matrix, configured to detect an occurrence of one fault for a first line from one or more activation masks based on one or more weighting factor for the first pair of protection relays in the first zone. The collaborative protection mask includes a second pair of protection relays (R3, R8) are positioned in a second zone (zone 2), over the second performance matrix and the third performance matrix, configured to detect the occurrence of one fault for the first line from one or more activation masks based on one or more weighting factor for the second pair of protection relays in the second zone. The collaborative protection mask includes a third pair of protection relays (R1, R10) are positioned in a third zone (zone 3), over the third performance matrix, configured to detect the occurrence of one fault for the first line from one or more activation masks based on one or more weighting factor for the third pair of protection relays in the third zone.

In another exemplary embodiment, the foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 1 illustrates an exemplary representation of a flow diagram of a method for a collaborative protection mask for a wide area protection, according to prior art.

FIG. 11 shows Table III which represents collaborative relay activation masks for Line L3 across all protection zones.

FIG. 12 shows Table IV which represents collaborative relay activation masks for line L3 when only relay R3 or R8 detects a fault.

FIG. 13 shows Table V which illustrates collaborative relay activation masks for line L3 when only relay R5 or R6 detects a fault.

FIG. 14 shows Table XVII which illustrates a performance matrices of the CGA algorithm in the best case scenario.

FIG. 15 shows Table XIX which illustrates a CGA countermeasure when the traditional GA algorithm made a wrong fault detection in the best-case scenario.

FIG. 16 shows Table XXI which illustrates a consideration of the CGA countermeasure when the GA algorithm made a wrong fault detection in the base-case scenario.

DETAILED DESCRIPTION

Figure 2:
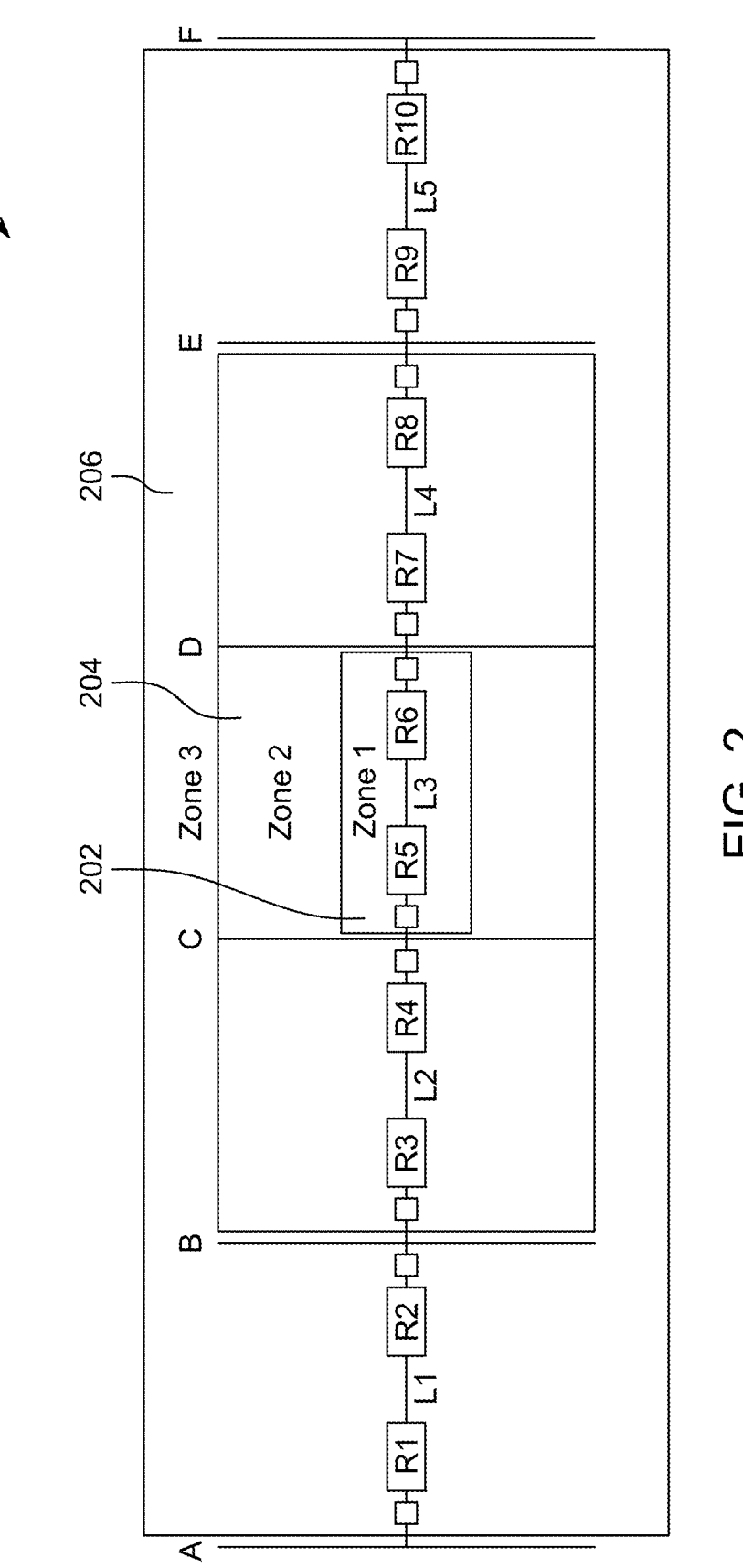
FIG. 2 illustrates an exemplary representation of distance relays over L3 for three zones disclosing a collaborative protection mask for a wide area protection system, according to an embodiment of the present invention.

In the drawings, like reference numerals designate identical or corresponding parts throughout the several views. Further, as used herein, the words "a", "an" and the like generally carry a meaning of "one or more", unless stated otherwise.

Furthermore, the terms "approximately," "approximate", "about" and similar terms generally refer to ranges that include the identified value within a margin of 20%, 10%, or preferably 5%, and any values therebetween.

The present disclosure provides a method and a system for enhancing wide-area backup protection in a power transmission network by employing a collaborative protection mask across multiple zones of distance relays. The present disclosure uses a collaborative genetic algorithm (CGA) to dynamically coordinate protection relays based on activation masks, performance matrices, and weighting factors. The disclosure introduces relay collaboration patterns across zones to increase the likelihood of accurate fault detection even under network uncertainties such as communication delays, measurement errors, high fault impedance, or relay failures. The disclosure further supports both offline training for optimization of relay weighting factors and online fault detection to maximize reliability in real-time scenarios. Additionally, the present disclosure provides for the use of simulation-based assessment of protection strategies to validate accuracy, scalability, and robustness of the proposed scheme.

In various aspects of the disclosure, non-limiting definitions of one or more terms that will be used in the document are provided below.

A term "collaborative genetic algorithm (CGA)" refers to an optimization algorithm that incorporates both ideal relay performance matrices and collaborative relay performance patterns to guide relay coordination and maximize true fault detection accuracy under uncertain conditions.

A term "distance relay" refers to a protective relay that monitors voltage and current measurements across transmission lines to detect impedance changes and identify faults within defined protection zones.

A term "zone" refers to a defined region of a transmission line monitored by distance relays, typically divided into zone 1 (primary), zone 2 (backup), and zone 3 (remote backup), each with distinct time and distance reach settings.

A term "performance matrix" refers to a representation of relay operations across different protection zones, updated after each fault occurrence, to indicate whether a relay detects a fault or remains inactive.

A term "activation mask" refers to a preassigned collaborative pattern applied to performance matrices to enforce coordinated relay activations across zones when at least one relay detects a fault.

A term "weighting factor" refers to a numerical value assigned to the contribution of a relay in determining the objective function for fault detection, optimized through the CGA to reflect both ideal and collaborative performance.

A term "line processing unit (LPU)" refers to a unit responsible for collecting relay operation data and exchanging communication packets with a cyber-physical system (CPS) to facilitate coordinated fault detection across relays.

The term "cyber-physical system (CPS)" refers to the communication infrastructure enabling data exchange among relays, the LPUs, and control units to support collaborative fault detection and relay coordination.

The present disclosure provides a method and a system for wide-area backup protection in a power transmission network by integrating collaborative relay activation into a genetic algorithm-based optimization. The protection system includes a plurality of distance relays distributed across multiple protection zones, each associated with activation masks and performance matrices. Upon detection of a fault by one relay, the collaborative activation mechanism enforces simultaneous or simulated detection by paired relays across corresponding zones, thereby establishing a stronger and more reliable fault indication pattern.

One of the objectives of the present disclosure is to ensure that even minimal relay detections are sufficient to trigger a network-wide collaborative response, significantly improving true fault detection accuracy under worst-case conditions. The present disclosure optimizes relay weighting factors during offline training by incorporating both ideal relay assignments and collaborative activation masks into the objective function. During online operation, the optimized factors enable rapid and accurate fault identification by maximizing the objective function value associated with the faulted line.

The present disclosure addresses several challenges in wide-area backup protection. A significant challenge is the degradation of fault detection accuracy under compounded uncertainties such as communication errors, relay malfunctions, and high fault resistance. Another challenge is ensuring effective coordination among distributed relays without excessive reliance on perfect synchronization or centralized control. The method and the system of the present disclosure consider these challenges by enforcing collaborative relay activation patterns and by optimizing relay weighting factors to remain resilient against worst-case operating conditions.

The present disclosure provides a comprehensive solution for reliable wide-area backup protection in power transmission systems, ensuring enhanced resilience, improved coordination, and sustained detection accuracy across a wide range of operating scenarios.

FIG. 1 illustrates an exemplary representation of a flow diagram of a method 100 for a collaborative protection mask for a wide area protection, according to prior art.

The method 100 focuses on a first power transmission line (L3) and utilizes three pairs of protection relays located in three different protection zones: a first pair (R5, R6) in Zone 1, a second pair (R3, R8) in Zone 2 104, and a third pair (R1, R10) in Zone 3. The method 100 relies on a set of pre-assigned activation masks ($D^{I}$, $D^{II}$, $D^{III}$) and weighting factors ($W^{I}$, $W^{II}$, $W^{III}$) that have been optimized offline, for instance, by a collaborative genetic algorithm (CGA). These elements work together to evaluate the likelihood of a fault on line L3.

At step 102, the method 100 determines if a first pair of protection relays (R5, R6) in the first zone detects an occurrence of one fault for a first line (L3) from a first activation mask (activation mask $D^{I}$) based on a first weighting factor for the first pair of protection relays in the first zone. In a preferred embodiment, R5 and R6 are positioned at opposite ends of line segment L3 within zone 1 of a wide-area protection system. Both relays continuously monitor current and voltage signals and feed their detection results into the performance matrix $D^{I}$. The first activation mask $D^{I}$ specify logical conditions under which fault detection by either R5 or R6 forces both relays into a detection state, thereby ensuring redundancy. The weighting factor $W^{I}$ is assigned using the CGA, which optimizes the trust level of R5 and R6 by comparing real-time relay states $d_i$ with an ideal detection state $D^{I}$. For example, when R5 detects a ground fault and enters state "1," it transmits a detection packet to R6, which then also enters state "1," even if its own local sensors did not initially register the fault.

At step 104, the method 100 determines if the first pair of protection relays in the first zone 102 detects the occurrence of the one fault for the first line from a second activation mask (activation mask $D^{II}$) based on a second weighing factor for the first pair of protection relays in the first zone. This step assesses if the Zone 1 relays (R5, R6) have also operated in a manner consistent with a Zone 2 fault, which is defined by the second activation mask $D^{II}$. This is a crucial aspect of the invention as it accounts for over-reach by Zone 1 relays or a fault located near the boundary between Zone 1 and Zone 2. The second weighting factor $W^{II}$ is used to evaluate the significance of this particular detection pattern.

At step 106, the method 100 determines if a second pair of protection relays (R3, R8) in a second zone detects the occurrence of the one fault for the first line from the second activation mask (activation mask $D^{II}$) based on a second weighing factor for the second pair of protection relays in the second zone. Simultaneously with step 104, the method 100 checks the status of the second pair of relays (R3, R8) in Zone 2. A detection is determined by evaluating their status against the second activation mask $D^{II}$ using the corresponding second weighting factor $W^{II}$. If either relay detects the fault under $D^{II}$, the activation propagates to its pair and may further propagate to zone 1 relays R5 and R6. This step establishes a detection pattern for a potential Zone 2 fault, which is a key part of the backup protection scheme.

At step 108, the method 100 determines if the first pair of protection relays in the first zone detects the occurrence of the one fault for the first line from a third activation mask (activation mask $D^{III}$) based on a third weighing factor for the first pair of protection relays in the first zone. This step further expands the evaluation to a potential Zone 3 fault. The method checks if the primary Zone 1 relays (R5, R6) have operated in a manner consistent with the Zone 3 fault, as defined by the third activation mask $D^{III}$, using the third weighting factor $W^{III}$. The outputs of relays R5 and R6 are processed under $D^{III}$ with the third weighting factor $W^{III}$, producing a detection state for the first zone under $D^{III}$.

At step 110, the method determines if the second pair of protection relays (R3, R8) in the second zone detects the occurrence of the one fault for the first line from the third activation mask (activation mask $D^{III}$) based on the third weighing factor for the for the second pair of protection relays in the second zone. This determination evaluates the status of the Zone 2 relays (R3, R8) against the third activation mask $D^{III}$ and the third weighting factor $W^{III}$, thereby establishing whether the second zone confirms the occurrence of the fault under the third activation mask.

At step 112, the method 100 determines if a third pair of protection relays (R1, R10) in a third zone detects the occurrence of the one fault for the first line from the third activation mask (activation mask $D^{III}$) based on the third weighing factor for the third pair of protection relays in the third zone. This is the final check and confirmation for a Zone 3 fault. The system specifically examines the status of the third pair of relays (R1, R10) and determines if their operation is consistent with the pattern in the third activation mask $D^{III}$ using the third weighting factor $W^{III}$.

At step 114, the method 100 performs one or more operations on the first pair of protection relays based on the determinations, the second pair of protection relays, and the third pair of protection relays in their respective zones. In one embodiment, the operations include activating, closing, or reclosing the first pair of protection relays according to a performance matrix that specifies the operational sequence once the detection conditions are satisfied across the zones. The use of performance matrices ensures that the operational steps are executed in a predetermined sequence based on the collaborative detection results obtained from the activation masks and the weighting factors applied to each zone.

In an embodiment, the one or more operations include activating, closing, or reclosing, over a first performance matrix, the first pair of protection relays for the first zone after the first pair of protection relays (R5, R6) is determined to detect the occurrence of one fault for the first line (L3) from the first activation mask $D^I$ based on a first weighting factor. In this embodiment, the first performance matrix defines the operational condition sequence specific to the first activation mask $D^I$, and the actions of activating, closing, or reclosing the relays are executed when the detection state of the first pair of relays under the first activation mask $D^I$ satisfies the threshold determined by the weighting factor $W^I$.

In an embodiment, the one or more operations include activating, closing, or reclosing, over a second performance matrix, the first pair of protection relays for the first zone after the first pair of protection relays in the first zone is determined to detect the occurrence of the fault for the first line (L3) from the second activation mask $D^{II}$ based on a second weighting factor. The second performance matrix is associated with the second activation mask $D^{II}$ and prescribes an operational logic distinct from the first activation mask $D^I$.

In an embodiment, the one or more operations include activating, closing, or reclosing, over a first performance matrix, the first pair of protection relays for the first zone after the first pair of protection relays in the first zone is determined to detect the occurrence of the fault for the first line from the second activation mask $D^{II}$ based on the second weighting factor. In this variation, the output of the relays under the second activation mask $D^{II}$ is applied to the operational sequence of the first activation mask $D^I$, providing flexibility in mapping detection logic to different performance matrices.

In an embodiment, the one or more operations includes activating, closing, or reclosing, over a second performance matrix, the second pair of protection relays (R3, R8) for the second zone after the second pair of protection relays is determined to detect the occurrence of the fault for the first line (L3) from the second activation mask $D^{II}$ based on the second weighting factor. The operational logic in this embodiment ensures that zone 2 executes actions corresponding to its own detection results under the second activation mask $D^{II}$.

In an embodiment, the one or more operations includes activating, closing, or reclosing, over a second performance matrix, the first pair of protection relays for the first zone after the second pair of protection relays (R3, R8) in the second zone is determined to detect the occurrence of the fault for the first line (L3) from the second activation mask $D^{II}$ based on the second weighting factor. This embodiment implements cross-zone propagation, where detection by relays in zone 2 initiates operational actions in zone 1 under the second activation mask $D^{II}$.

In an embodiment, the one or more operations includes activating, closing, or reclosing, over a first performance matrix, the first pair of protection relays for the first zone after the second pair of protection relays (R3, R8) in the second zone is determined to detect the occurrence of the fault for the first line (L3) from the second activation mask $D^{II}$ based on the second weighting factor. This embodiment links the detection output of zone 2 under the second activation mask $D^{II}$ to the operational sequence defined by the first performance matrix.

In an embodiment, the one or more operations includes activating, closing, or reclosing, over a third performance matrix, the first pair of protection relays for the first zone after the first pair of protection relays in the first zone is determined to detect the occurrence of the fault for the first line (L3) from the third activation mask $D^{III}$ based on a third weighting factor. This embodiment implements direct operations in zone 1 aligned with the third activation mask.

In an embodiment, the one or more operations includes activating, closing, or reclosing, over a second performance matrix, the first pair of protection relays for the first zone after the first pair of protection relays in the first zone is determined to detect the occurrence of the fault for the first line (L3) from the third activation mask $D^{III}$ based on the third weighting factor. This variation applies the results of the third activation mask $D'''$ detection to the sequence of the second activation mask $D''$ operations.

In an embodiment, the one or more operations includes activating, closing, or reclosing, over a first performance matrix, the first pair of protection relays for the first zone after the first pair of protection relays in the first zone is determined to detect the occurrence of the fault for the first line (L3) from the third activation mask $D'''$ based on the third weighting factor. This embodiment applies third activation mask $D'''$ detection results to the operational logic of the first activation mask $D'$.

In an embodiment, after the first pair of protection relays in the first zone is determined to detect the occurrence of the fault for the first line (L3) from the third activation mask $D'''$ based on the third weighting factor, the one or more operations include sequentially activating, closing, or reclosing: the second pair of protection relays for the second zone over a third performance matrix, the first pair of protection relays for the first zone over the third performance matrix, the second pair of protection relays for the second zone over a second performance matrix, the first pair of protection relays for the first zone over the second performance matrix, and the first pair of protection relays for the first zone over a first performance matrix. This embodiment defines an operational sequence initiated by detection in zone 1 under the third activation mask $D'''$.

In an embodiment, after the third pair of protection relays in the third zone is determined to detect the occurrence of the fault for the first line (L3) from the third activation mask $D'''$ based on the third weighting factor, the one or more operations include sequentially activating, closing, or reclosing: the third pair of protection relays for the third zone over a third performance matrix, the second pair of protection relays for the second zone over the third performance matrix, the first pair of protection relays for the first zone over the third performance matrix, the second pair of protection relays for the second zone over a second performance matrix, the first pair of protection relays for the first zone over the second performance matrix, and the first pair of protection relays for the first zone over a first performance matrix. This embodiment specifies a cascaded operational sequence initiated by detection in zone 3 under the third activation mask $D'''$.

FIG. 2 illustrates an exemplary representation 200, distance relays over L3 for three zones, disclosing a collaborative protection mask for a wide-area protection system, according to an embodiment of the present invention. FIG. 2 should be read in conjunction with FIG. 1 to perform the disclosure.

To enhance clarity in the description, different formatting styles are used to distinguish between the protection zones for fault identification. The formatting corresponds to the following: Zone 1 is represented in bold, Zone 2 is represented in italics, and Zone 3 is represented with an underline.

In a preferred embodiment, the present disclosure provides the collaborative protection mask for a wide-area protection system in a power transmission network. The collaborative protection mask coordinates the operation of multiple distance relays across different protection zones to enhance fault detection reliability, particularly under conditions of network uncertainty such as communication errors, high fault impedance, or relay malfunctions. The system is explained with respect to a first line (L3) monitored by three protection zones. A first pair of protection relays, designated as R5 and R6, is positioned in zone 1 or the first zone 202, over a first performance matrix, a second performance matrix, and a third performance matrix. The first pair of protection relays is configured to detect an occurrence of one fault for a first line from one or more activation masks based on one or more weighting factors for the first pair of protection relays in the first zone 202.

Further, a second pair of protection relays, designated as R3 and R8, is positioned in zone 2 or second zone 204, over the second performance matrix and the third performance matrix, configured to detect the occurrence of one fault for the first line from one or more activation masks based on one or more weighting factors for the second pair of protection relays in the second zone 204.

Furthermore, a third pair of protection relays, designated as R1 and R10, is positioned in zone 3 206, over the third performance matrix, configured to detect the occurrence of one fault for the first line from one or more activation masks based on one or more weighting factors for the third pair of protection relays in the third zone 206.

Each pair of protection relays is arranged at line ends or adjacent line segments and is functionally associated with the first, the second and the third performance matrices, namely $D'$, $D''$, and $D'''$. The first, the second and the third performance matrices represent the real-time operating state of the relays across the first zone 202, the second zone 204 and the third zone 206.

Line effective distance relays (LEDRs) play an important role in wide-area protection systems to protect the transmission line Lj, where j=1, . . . , m by assigning relay Ri, where i=1, . . . , n for the three zones, as shown in the FIG. 1 (m=5 lines and n=10 relays). Considering line 3 (L3), the LEDRs for zone 1 are relays R5 and R6, those for zone 2 are relays R5, R6, R3, and R8 relays, and those for zone 3 are relays R5, R6, R3, R8, R1, and R10, as illustrated in Table I.

Table I discloses ideal performance matrices for line L3 in the three zones.

| | Line number | | | | |
| --- | --- | --- | --- | --- | --- |
| | L1 | L2 | L3 | L4 | L5 |
| | | | Relay number | | |
| | R1, R2 | R3, R4 | R5, R6 | R7, R8 | R9, R10 |
| Zone 1 D′* | 0 | 0 | 1 | 0 | 0 |
| Zone 1 D′* | 0 | 0 | 1 | 0 | 0 |
| Zone 2 D″* | 0 | 1 | 1 | 0 | 0 |
| Zone 2 D″* | 0 | 0 | 1 | 1 | 0 |
| Zone 3 D‴* | 1 | 1 | 1 | 0 | 0 |
| Zone 3 D‴* | 0 | 0 | 1 | 1 | 1 |

Performance matrices of dimension (n×1) corresponding to the protection zones 1, 2, and 3 are denoted as $D'$, $D''$, and $D'''$, respectively. The matrices are changed after each fault and are updated by receiving data from LPUs and CPS. Hence, relay Ri can be updated for zones 1, 2, and 3 as follows:

$$d_{i1} = \begin{cases} 1 & \text{if relay } Ri \text{ operates} \\ 0 & \text{if relay } Ri \text{ does not operate} \end{cases} \quad (1)$$

On the other hand, ideal performance matrices of dimension (n×m) in accordance with the protection zones 1, 2, and 3 are represented as $D'^*$, $D''^*$, and $D'''^*$, respectively, and can be rewritten as follows:

$$D^I = \begin{bmatrix} R1 \\ R2 \\ R3 \\ R4 \\ R5 \\ R6 \\ R7 \\ R8 \\ R9 \\ R10 \end{bmatrix} \quad D^{II} = \begin{bmatrix} R1 \\ R2 \\ R3 \\ R4 \\ R5 \\ R6 \\ R7 \\ R8 \\ R9 \\ R10 \end{bmatrix} \quad D^{III} = \begin{bmatrix} \underline{R1} \\ R2 \\ R3 \\ R4 \\ R5 \\ R6 \\ R7 \\ R8 \\ R9 \\ \underline{R10} \end{bmatrix}$$

In an aspect, [bold] on R5 and R6 refer to the first zone 202 over the performance matrices $D^I$, $D^{II}$, and $D^{III}$.

In an aspect, [italics] on *R3* and *R8* refer to the second zone 204 over the performance matrices $D^{II}$, and $D^{III}$.

In an aspect, [underlined] on R10 refers to the third zone 206 over the performance matrix $D^{III}$.

The closure operation, activation, or reclosing of relay Ri is described in equation (1).

The actual protection assignment of protection relay Ri, whether line Lj is protected or not, is defined as follows:

$$d^*_{ij} = \begin{cases} 1 & \text{if relay } Ri \text{ is assigned to line } Lj \\ 0 & \text{if relay } Ri \text{ is not assigned to line } Lj \end{cases} \quad (2)$$

The construction of ideal performance matrices $$D_3^{I*, II*, III*}$$

for line L3 is illustrated in Table I. Generalizing over all the six transmission lines, the ideal performance matrices for the three zones can be written as follows:

$$D^{I*} = \begin{bmatrix} 1 & 0 & 0 & 0 & 0 \\ 1 & 0 & 0 & 0 & 0 \\ 0 & 1 & 0 & 0 & 0 \\ 0 & 1 & 0 & 0 & 0 \\ 0 & 0 & 1 & 0 & 0 \\ 0 & 0 & 1 & 0 & 0 \\ 0 & 0 & 0 & 1 & 0 \\ 0 & 0 & 0 & 1 & 0 \\ 0 & 0 & 0 & 0 & 1 \\ 0 & 0 & 0 & 0 & 1 \end{bmatrix} \quad D^{II*} = \begin{bmatrix} 1 & 1 & 0 & 0 & 0 \\ 1 & 0 & 0 & 0 & 0 \\ 0 & 1 & 1 & 0 & 0 \\ 1 & 1 & 0 & 0 & 0 \\ 0 & 0 & 1 & 1 & 0 \\ 0 & 1 & 1 & 0 & 0 \\ 0 & 0 & 0 & 1 & 1 \\ 0 & 0 & 1 & 1 & 0 \\ 0 & 0 & 0 & 0 & 1 \\ 0 & 0 & 0 & 1 & 1 \end{bmatrix} \quad D^{III*} = \begin{bmatrix} 1 & 1 & 1 & 0 & 0 \\ 1 & 0 & 0 & 0 & 0 \\ 0 & 1 & 1 & 1 & 0 \\ 1 & 1 & 0 & 0 & 0 \\ 0 & 0 & 1 & 1 & 1 \\ 1 & 1 & 1 & 0 & 0 \\ 0 & 0 & 0 & 1 & 1 \\ 0 & 1 & 1 & 1 & 0 \\ 0 & 0 & 0 & 0 & 1 \\ 0 & 0 & 1 & 1 & 1 \end{bmatrix} \quad (3)$$

In accordance with equation (1), each relay state $d_i$ is set to "1" when the relay detects the occurrence of one fault and is set to "0" when the relay does not detect the occurrence of one fault.

The collaborative protection mask further comprises the first pair of protection relays R5 and R6 positioned in the first zone 202, the second pair of protection relays R3 and R8 positioned in the second zone 204, and the third pair of protection relays R1 and R10 positioned in the third zone 206. The first pair of protection relays R5 and R6 are logically associated with the first performance matrix $D^I$, the second performance matrix $D^{II}$, and the third performance matrix $D^{III}$. The second pair of protection relays R3 and R8 are logically associated with the second performance matrix $D^{II}$ and the third performance matrix $D^{III}$. The third pair of protection relays R1 and R10 are logically associated with the third performance matrix $D^{III}$. The detection of an occurrence of one fault for the first line L3 is determined from the one or more activation masks that apply to each zone. The detection is further based on the one or more weighting factors assigned to each pair of relays during an optimization process such as a collaborative genetic algorithm (CGA). During this optimization, the one or more weighting factors $W^I$, $W^{II}$, and $W^{III}$ are calculated using equations (4)-(6), combining relay states from the performance matrices with the ideal performance matrices $D^I$, $D^{II}$, and $D^{III}$. The objective function $OF(L_j)$ is maximized to identify the faulted line $L_j$.

The operation function ($F_O$) and the expectation function ($F_E$) incorporate the weighting factor matrix, the ideal performance matrices, and the performance matrices. The operation function $F_O$ of line Lj is changed after each fault and can be calculated as follows:

$$F_O(L_j) = \sum_{i=1}^{n} w_{ji}^I d_{i1}^I + w_{ji}^{II} d_{i1}^{II} + w_{ji}^{III} d_{i1}^{III} \quad (4)$$

where $W^I$, $W^{II}$, and $W^{III}$ are the weighting factors matrices of dimension (m, n) obtained from the training process using the CGA algorithm for the three zones. The expectation function $F_E$ of line Lj is kept fixed and can be calculated in the initial stage as follows:

$$F_E(L_j) = \sum_{i=1}^{n} w_{ji}^I d_{ij}^{I*} + w_{ji}^{II} d_{ij}^{II*} + w_{ji}^{III} d_{ij}^{III*} \quad (5)$$

Table II represents probability distribution of random events.

| Random Event | Outcome | Probability |
|---|---|---|
| Discrete uniform distribution U{a, b} | | |
| Faulted line | i = 1, 2, . . . , 6 | $P_i = 1/m$ |
| Relay failure | j = 1, 2, . . . , 12 | $P_j = 1/Pf$ |
| Data exchange error | j = 1, 2, . . . , 12 | $P_j = 1/Pd$ |
| Continuous uniform distribution U[a, b] | | |
| Fault location on i | 0%-100% | U[0, 1] |
| Non-uniform distribution | | |
| Fault type | $\varphi_1, \varphi_2, \varphi_3$ | $P\varphi_1, P\varphi_2, P\varphi_3$ |
| Fault resistance Ω | 0, 20, 40, 70 | $P_0, P_{20}, P_{40}, P_{70}$ |
| Normal distribution N(μ, σ) | | |
| Measurement error | | N(0, Pe) |

Similarly to the ideal performance matrices $D^{I*}$, $D^{II*}$, and $D^{III*}$ for line L3, as shown in Table I, and the LEDR scheme in FIG. 1, the proposed collaborative protection mask is defined over the performance matrices $D^I$, $D^{II}$, and $D^{III}$, which are updated after every fault occurrence as described for line L3 in Table III. In zones 1, 2, and 3, the collaborative mask considers the main pair protection relays R5 and R6, which are located in zone 1 over the performance matrices $D^I$, $D^{II}$, and $D^{III}$. In zones 2 and 3, the proposed mask considers the side pair protection relays R3 and R8, which are located in zone 2 over the performance matrices $D^{II}$ and $D^{III}$. In zone 3, the proposed mask considers the side pair protection relays R1 and R10, which are located in zone 3 over the performance matrix $D^{III}$.

In the first zone 202, the occurrence of at least one fault detection between the paired relays R5 or R6 will result in an immediate collaborative protection, as shown in bold Table III. The relays that are aware of the fault occurrence, which can be relay R5, relay R6, or both relay, will enable the immediate detection by the other paired relay, R6 or R5, through an LPU and CPS communication packet. In the case of detection by the main paired protection relays R5 and R6, this ensures the detection ability of the main paired protection relays R5 and R6 through a redundant LPU and CPS communication packet initiated by both main paired protection relays R5 and R6. In the case of non-detection by the main paired protection relay R5 or R6, this enforces the main paired protection relays R5 and R6 to pretend to detect the fault occurrence through an LPU and CPS communication packet initiated by a single main paired detection relay, relay R5 or relay R6.

In the second zone 204, the aforementioned discussion related to zone 1 is valid within zone 2. Finally, any detections by the side protection relays R3 and R8 will immediately activate each other, as shown in italics in Table III, and also send an LPU and CPS communication packet to zone 1 and zone 2 to activate their main paired protective relays R5 and R6. In the case of detection by the side paired protection relays R3 and R8, and the main paired protection relays R4 and R5, this ensures the detection ability of the side paired protection relays R3 and R8 and the main paired protection relays R5 and R6 through a redundant LPU and CPS communication packet initiated by both side paired protection relays R3 and R8. In the case of non-detection by the side paired protection relay R3 or R8, and the main paired protection relays R5 and R6, this enforces the side paired protection relays R3 and R8 and the main paired protection relays R5 and R6 to pretend to detect the fault occurrence through an LPU and CPS communication packet initiated by a single side paired protection relay, either relay R3 or relay R7.

In the third zone 206, the aforementioned discussion related to zones 1 and 2 is valid within zone 3. Finally, any detections by the two-level side relays R1 and R10 will activate each other immediately, as shown underlined in Table III, and also send an LPU and CPS packet to zone 2 and zone 1 to activate their side paired protection relays R3 and R8 as well as the main paired protection relays R5 and R6, respectively. In the case of detection by the two-level side paired protection relays R1 and R10, the side paired protection relays R3 and R8, and the main paired protection relays R5 and R6, this ensures the detection ability of the two-level side paired protection relays R1 and R10, the side paired protection relays R3 and R8, and the main paired protection relays R5 and R6 through a redundant LPU and CPS communication packet initiated by both paired relays R1 and R10. In the case of non-detection by the two-level side paired protection relay R1 or R10, the side paired protection relays R3 and R8, and the main paired protection relays R5 and R6, this enforces the two-level side paired protection relays R1 and R10, the side paired protection relays R3 and R8, and the main paired protection relays R5 and R6 to pretend to detect the fault occurrence through the LPU and CPS communication packet initiated by a single two-level side paired protection relay, either relay R1 or relay R2.

Table III represents collaborative relay activation masks for Line L3 across all protection zones (see FIG. 11).

In an embodiment, the first pair of protection relays R5 and R6 in the first zone 202 are configured to establish immediate collaborative protection. When either relay R5 or relay R6 detects the occurrence of one fault for the first line L3, the detection state of the detecting relay is transmitted to its paired relay. The paired relay then enters a detection state in the first, the second and the third performance matrices $D^{I}$, $D^{II}$, and $D^{III}$, regardless of whether either relay R5 or relay R6 independently measured the fault. The collaboration provides redundancy within the first zone 202. The activation mask $D^{I}$, as illustrated in Table III, specifies that detection by one of the first pair of protection relays forces activation of both relays R5 and R6.

In an embodiment, when one of the first pair of protection relays R5 and R6 does not detect the occurrence of one fault for the first line L3, a simulation of fault detection is triggered. The simulation is carried out by generating a line processing unit communication packet and a cyber physical system communication packet. The line processing unit communication packet and the cyber physical system communication packet update the performance matrices such that both relays R5 and R6 are set to an active detection state. This mechanism allows the collaborative protection mask to maintain consistency in detection even if one relay fails.

In an embodiment, the line processing unit communication packet and the cyber physical system communication packet are generated directly by the first pair of protection relays R5 and R6. When a fault is detected by one of the relays in the first pair, the detecting relay initiates the communication packets, and the packets enforce fault detection in the paired relay. The same communication packets may also be initiated by another first pair of protection relays in the system. In such a case, detection triggered in one zone can propagate to another zone, extending the collaborative detection process.

In an embodiment, the second pair of protection relays R3 and R8 are configured to create immediate collaborative protection. If either relay R3 or relay R8 detects the occurrence of one fault for the first line L3, the detection state is transmitted to the paired relay, which then enters a detection state in the second performance matrix $D^{II}$ and the third performance matrix $D^{III}$.

In response to the simultaneous detection of one fault by the first pair of protection relays, R5 and R6, and the second pair of protection relays, R3 and R8, the line processing unit communication packet and the cyber physical system communication packet are initiated by the second pair of protection relays, R3 and R8. This initiation confirms detection across both the first zone 202 and the second zone 204. The activation mask $D^{II}$, as illustrated in Table IV, defines that detection by either relay R3 or R8 propagates activation both to its pair and to relays R5 and R6 in the first zone 202.

Table IV represents collaborative relay activation masks for line L3 when only relay R3 or R8 detects a fault (see FIG. 12).

In an embodiment, the third pair of protection relays R1 and R10 are configured to create immediate collaborative protection. If either relay R1 or relay R10 detects the occurrence of one fault for the first line L3, the detection state is transmitted to the paired relay. The third pair of protection relays R1 and R10, then enters a detection state in the third performance matrix $D^{III}$. The activation mask $D^{III}$, as illustrated in Table V, specifies that detection by either relay R1 or R10 propagates activation to relays R3 and R8 in zone 2 and relays R5 and R6 in the first zone 202.

Table V illustrates collaborative relay activation masks for line L3 when only relay R5 or R6 detects a fault (see FIG. 13).

In an embodiment, when the first pair of protection relays R5 and R6 in zone 1 detect the occurrence of one fault for the first line L3 from the third activation mask $D^{III}$ based on the weighting factor assigned to the pair, a sequence of operations is carried out. First, the second pair of protection relays R3 and R8 in the second zone 204 are activated, closed, or reclosed over the third performance matrix $D^{III}$. Secondly, the first pair of protection relays R5 and R6 in the first zone 202 are activated, closed, or reclosed over the third performance matrix $D^{III}$. Thirdly, the second pair of protection relays R3 and R8 are activated, closed, or reclosed over the second performance matrix $D^{II}$. Fourthly, the first pair of protection relays R5 and R6 are activated, closed, or reclosed over the second performance matrix $D^{II}$. Finally, the first pair of protection relays R5 and R6 are activated, closed, or reclosed over the first performance matrix $D^{I}$. This collaborative propagation corresponds to the flow chart sequence described in the FIG. 3 for initiation of the first zone 202.

In an embodiment, when the third pair of protection relays R1 and R10 in the third zone 206 detects the occurrence of one fault for the first line L3 from the third activation mask $D^{III}$ based on the weighting factor assigned to the pair, a sequence of operations is carried out. First, the third pair of protection relays R1 and R10 in third zone 206 are activated, closed, or reclosed over the third performance matrix $D^{III}$. Second, the second pair of protection relays R3 and R8 in second zone 204 are activated, closed, or reclosed over the third performance matrix $D^{III}$. Third, the first pair of protection relays R5 and R6 in the first zone 202 are activated, closed, or reclosed over the third performance matrix $D^{III}$. Fourth, the second pair of protection relays R3 and R8 are activated, closed, or reclosed over the second performance matrix $D^{II}$. Fifth, the first pair of protection relays R5 and R6 are activated, closed, or reclosed over the second performance matrix $D^{II}$. Finally, the first pair of protection relays R5 and R6 are activated, closed, or reclosed over the first performance matrix $D^{I}$. This backward propagation corresponds to the flow chart sequence described in the FIG. 3 for initiation of the second zone 204 and the third zone 206.

Figure 3:
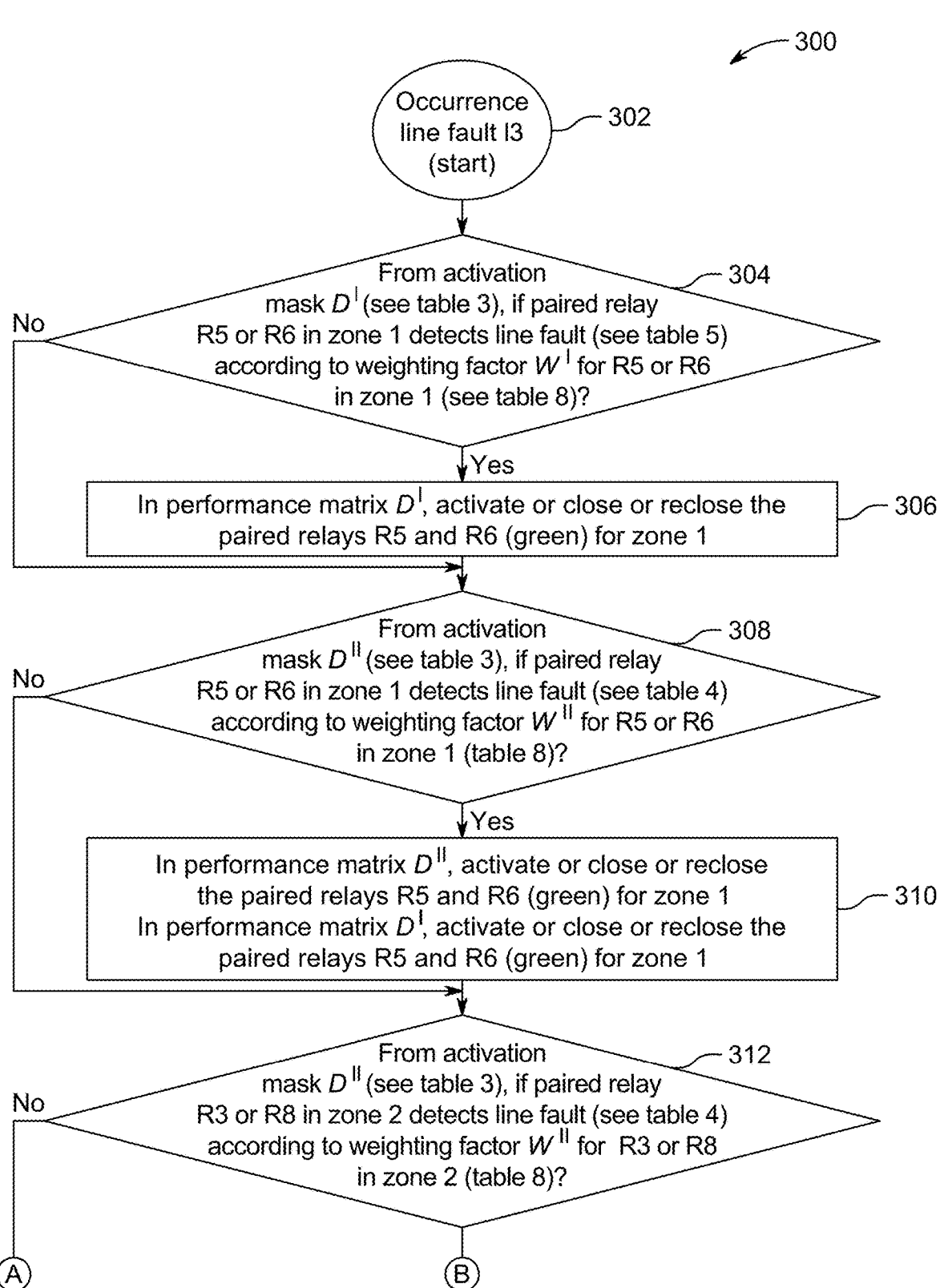
FIG. 3 illustrates a process flow for a method of a collaborative genetic algorithm (CGA) algorithm, according to certain embodiments.
Figure 3:
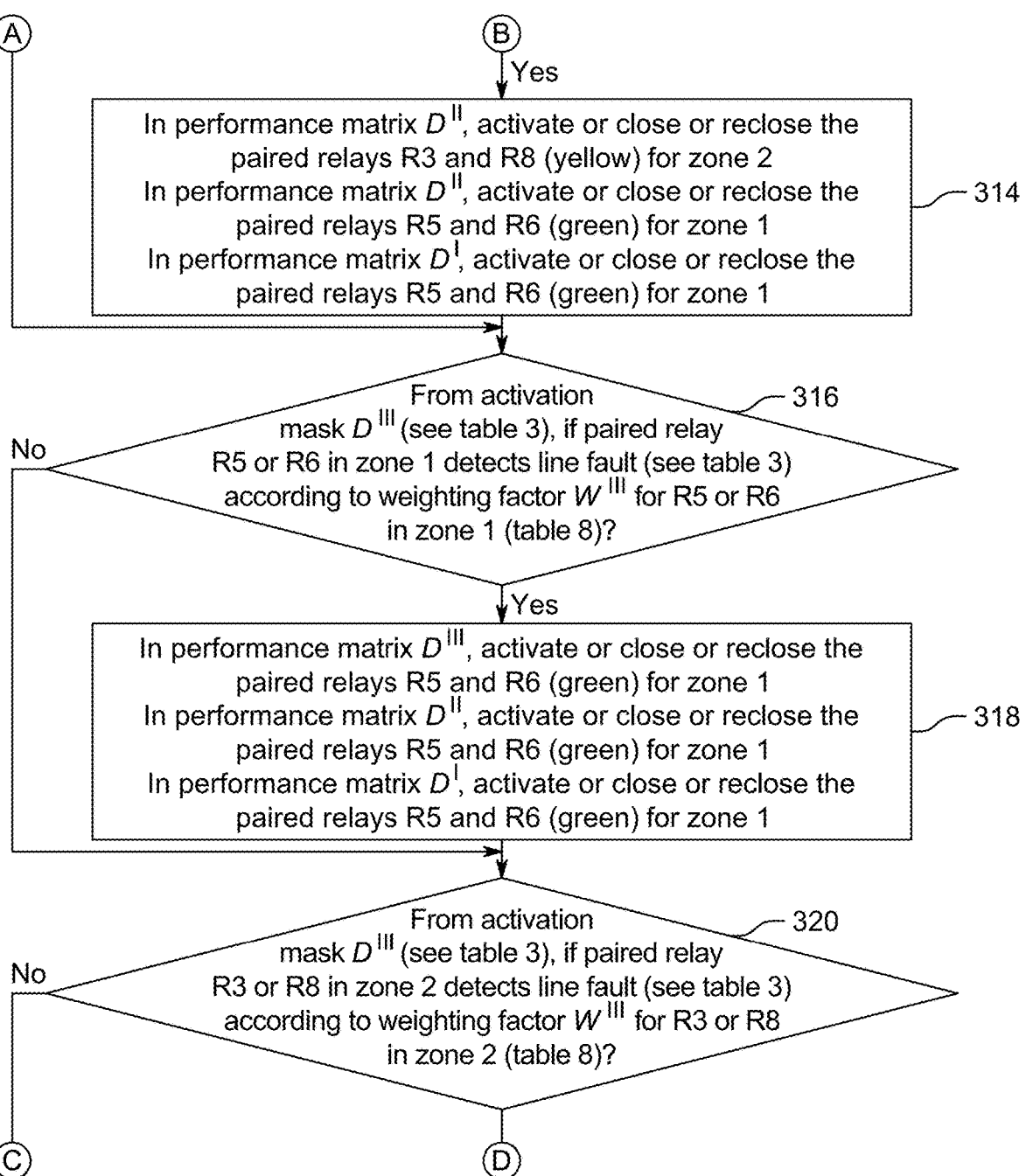

FIG. 3 illustrates a detailed flow chart 300 of the collaborative genetic algorithm (CGA) used in the collaborative protection mask for a wide-area protection system. FIG. 3 should be read in conjunction with FIG. 1 and FIG. 2 to perform the disclosure. The flow chart 300 describes the sequence of steps performed during the training and testing stages of the CGA in order to optimize the one or more weighting factors and to apply collaborative activation masks for reliable fault detection.

Step 302 discloses the occurrence of a line fault on line L3. This marks the starting point of the CGA process, where the collaborative protection mask begins analyzing the detection states of the paired relays across the zones.

Step 304 discloses checking the first activation mask $D^{I}$. In this step, if paired relay R5 or relay R6 in zone 1 detects the occurrence of the line fault L3, as defined in Table 5, according to the weighting factor $W^{I}$ for relay R5 or relay R6 in the first zone 202 (Table VIII), the condition is satisfied. If no detection occurs, the process exits this branch.

Step 306 discloses performing an action in performance matrix $D^{I}$ when the condition of step 304 is satisfied. In this case, the paired relays R5 and R6 are activated, closed, or reclosed (given in bold) in the zone 1 202. This enforces collaborative operation within zone 1 202 under activation mask $D^{I}$.

Step 308 discloses checking the second activation mask $D^{II}$. If paired relay R5 or relay R6 in zone 1 202 detects the occurrence of the line fault L3, as defined in Table IV, according to the weighting factor $W^{II}$ for relay R5 or relay R6 in the zone 1 202 (Table VIII), the condition is satisfied. If no detection occurs, the process exits this branch.

Step 310 discloses performing actions in the performance matrices $D^{I}$ and $D^{II}$ when the condition of step 308 is satisfied. In this case, the paired relays R5 and R6 are activated, closed, or reclosed (green) in zone 1 within performance $D^{II}$, and simultaneously the paired relays R5 and R6 are also activated, closed, or reclosed (bold) in zone 1 202 within performance matrix $D^{I}$.

At this point, the detection events have been applied in both performance matrices $D^{II}$ and $D^{I}$, and the flowchart continues to subsequent decision branches for further zones.

Step 312 discloses checking activation mask $D^{II}$ for the zone 2 204. In this step, if paired relay R3 or relay R8 in the zone 2 204 detects the occurrence of a line fault as defined in Table IV, according to the weighting factor $W^{II}$ for relay R3 or relay R8 in the zone 2 204 (Table VIII), the condition is satisfied. If no detection occurs, the process exits this branch and goes to step 318.

Step 314 discloses performing actions in the performance matrices when the condition of step 314 is satisfied. Specifically, in the performance matrix $D^{II}$, the paired relays R3 and R8 are activated, closed, or reclosed (italic) for zone 2 204. In performance matrix $D^{II}$, the paired relays R5 and R6 are activated, closed, or reclosed (bold) for zone 1 202. In performance matrix $D^{\hat{}}I$, the paired relays R5 and R6 are activated, closed, or reclosed (bold) for zone 1 202. This sequence transmits fault detection from the zone 2 204 into the zone 1 202, reinforcing collaborative protection.

Step 316 discloses checking activation mask $D^{III}$ for zone 1. In this step, if paired relay R5 or relay R6 in the zone 1 202 detects the occurrence of a line fault as defined in Table III, according to the weighting factor $W^{III}$ for relay R5 or relay R6 in the zone 1 202 (Table VIII), the condition is satisfied. If no detection occurs, the process exits this branch.

Step 318 discloses performing actions in the performance matrices when the condition of step 318 is satisfied. Specifically, in the performance matrix $D^{III}$, the paired relays R5 and R6 are activated, closed, or reclosed (bold) for the zone 1 202. In the performance matrix $D^{II}$, the paired relays R5 and R6 are activated, closed, or reclosed (bold) for the zone 1 202. In the performance matrix $D^{I}$, the paired relays R5 and R6 are activated, closed, or reclosed (bold) for the zone 1 202. This sequence strengthens detection within the zone 1 202 across all performance matrices when the activation mask $D^{III}$ applies.

Step 320 discloses evaluation of the activation mask $D^{III}$ for the zone 2 204. From the activation mask $D^{III}$ (see Table III), if paired relay R3 or R8 in the zone 2 204 detects line fault (see Table III) according to the weighting factor $W^{III}$ for R3 or R8 in the zone 2 204 (Table VIII), the condition is satisfied.

Step 322 discloses the collaborative actions applied when the condition of step 324 is satisfied. In the performance matrix $D^{III}$, activate or close or reclose the paired relays R3 and R8 (italic) for the zone 2 204. In the performance matrix $D^{II}$, activate or close or reclose the paired relays R5 and R6 (bold) for the zone 1 202. In the performance matrix $D^{II}$, activate or close or reclose the paired relays R3 and R8 (italic) for the zone 2 204. In the performance matrix $D^{I}$, activate or close or reclose the paired relays R3 and R8 (italic) for the zone 2 204. In the performance matrix $D^{II}$, activate or close or reclose the paired relays R5 and R6 (bold) for zone 1 202. In the performance matrix $D^{II}$, activate or close or reclose the paired relays R5 and R6 (bold) for the zone 1 202.

Step 324 discloses evaluation of the activation mask $D^{III}$ for the zone 3 206. From the activation mask $D^{III}$ (see Table III), if paired relay R1 or R10 in the zone 3 206 detects line fault (see Table III) according to weighting factor $W^{III}$ for R1 or R10 in the zone 3 206 (Table VIII), the condition is satisfied.

Step 326 discloses the collaborative actions applied when the condition of step 324 is satisfied. In the performance matrix $D^{III}$, activate or close or reclose the paired relays R1 and R10 (underlined) for the zone 3 206. In the performance matrix $D^{III}$, activate or close or reclose the paired relays R3 and R8 (italics) for the zone 2 204. In the performance matrix $D^{III}$, activate or close or reclose the paired relays R5 and R6 (bold) for the zone 1 202. In the performance matrix $D^{II}$, activate or close or reclose the paired relays R3 and R8 (italic) for the zone 2 204. In the performance matrix $D^{II}$, activate or close or reclose the paired relays R5 and R6 (bold) for the zone 1 202. In the performance matrix $D^{I}$, activate or close or reclose the paired relays R5 and R6 (bold) for the zone 1 202.

The collaborative activations produced by steps 322 and 326 complete the sequence for the activation mask $D^{III}$ across the zone 2 204 and the zone 3 206, and the flow ends.

Experiments

Figure 4:
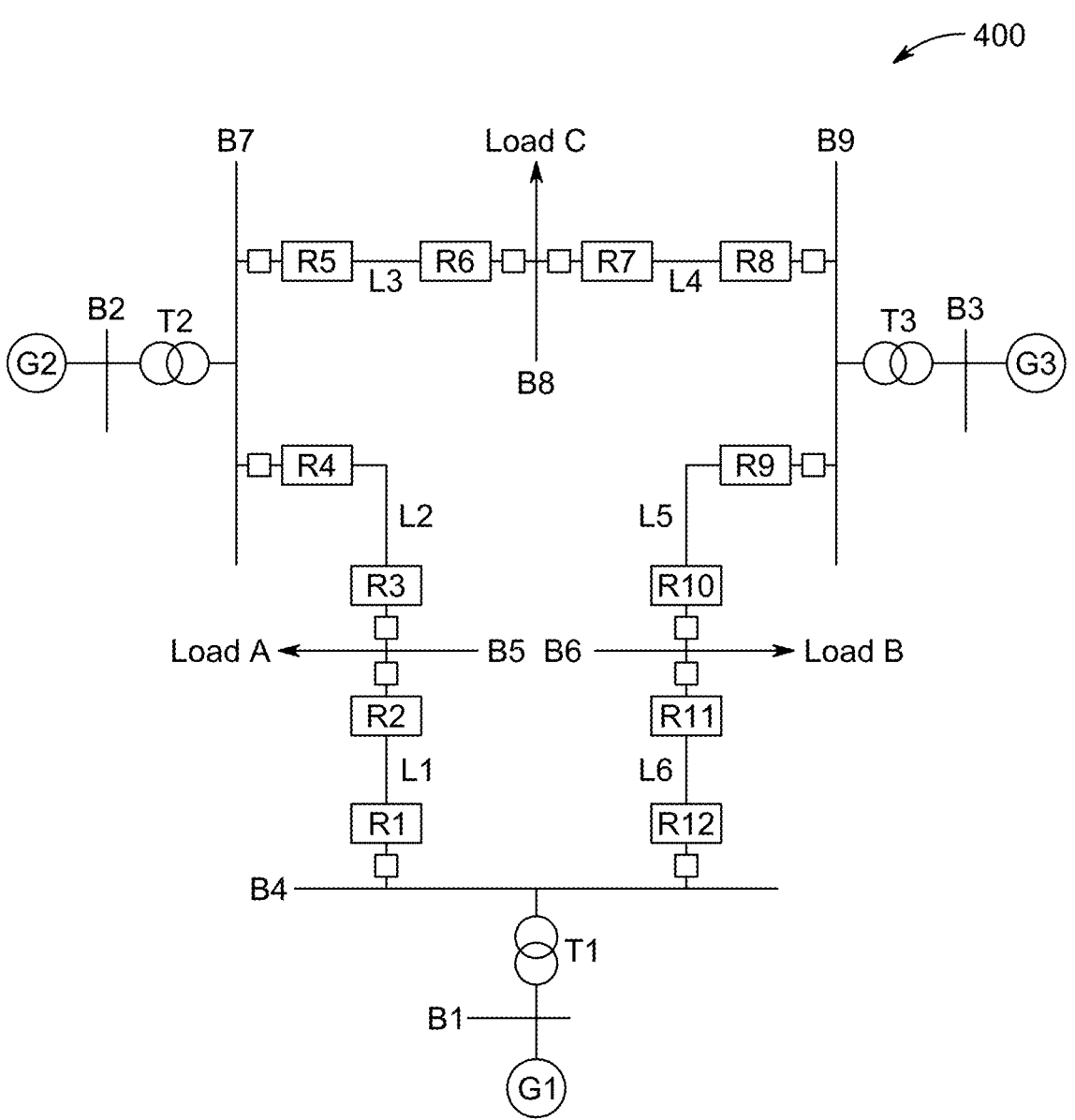
FIG. 4 illustrates an exemplary representation of a single-line schematic of the IEEE 9-bus test system used in experiments, according to certain embodiments.

FIG. 4 shows a single-line schematic 400 of the IEEE 9-bus test system used in the experiments, according to certain embodiments. The topology comprises three synchronous generators (G1-G3), nine buses (B1-B9), three transformers (T1-T3) and six transmission lines (L1-L6). Each transmission line end is monitored by a distance relay (R1-R12), yielding twelve relays in total as per the specifications mentioned in Table VI; the relays are implemented with six line protection units (LPUs) and coordinated with a centralized protection system (CPS). Load connection points A, B and C are indicated for fault location and performance evaluation. This test system is used to evaluate true fault detection under the best-case, base-case and worst-case scenarios. The performance of the power grid is examined considering the true fault detection in three main scenarios: the best-, base-, and worst-case scenarios, as per the specifications mentioned in Table VII.

Table VI discloses the specifications of the IEEE 9-bus system.

| | | Parameter settings $\Omega$ | | | |
|---|---|---|---|---|---|
| Lines | R1 ($\Omega$) | X1 ($\Omega$) | R0 ($\Omega$) | X0 ($\Omega$) | k0 |
| L1 | 5.29 | 44.965 | 15.87 | 134.91 | 0.67 |
| L2 | 16.928 | 85.169 | 50.79 | 255.51 | 0.67 |
| L3 | 4.4965 | 38.088 | 13.4 | 114 | 0.67 |
| L4 | 6.2951 | 53.3232 | 18.9 | 160 | 0.67 |
| L5 | 20.631 | 89.93 | 61.89 | 269.8 | 0.67 |
| L6 | 8.993 | 48.668 | 27 | 146 | 0.67 |

Table VII discloses the specification of the random events with probability distributions for best, base, and worst-case scenarios.

| Random | Scenario | | |
|---|---|---|---|
| Event | Best | Base | Worst |
| Fault type $f_1\varphi$ | 0.9 | 0.95 | 0.97 |
| Fault type $f_2\varphi$ | 0.04 | 0.02 | 0.01 |

-continued

| Random | Scenario | | |
|---|---|---|---|
| Event | Best | Base | Worst |
| Fault type $f_3\varphi$ | 0.06 | 0.03 | 0.02 |
| Fault resistance 0$\Omega$ | 0.59 | 0.39 | 0.1 |
| Fault resistance 20$\Omega$ | 0.19 | 0.29 | 0.12 |
| Fault resistance 40$\Omega$ | 0.12 | 0.18 | 0.19 |
| Fault resistance 70$\Omega$ | 0.1 | 0.14 | 0.59 |
| Relay failure $P_f$ | 0.02 | 0.1 | 0.2 |
| Measurement error $P_e$ | 0.01 | 0.05 | 0.1 |
| Data exchange error $P_d$ | 0.05 | 0.25 | 0.5 |

Figure 5A:
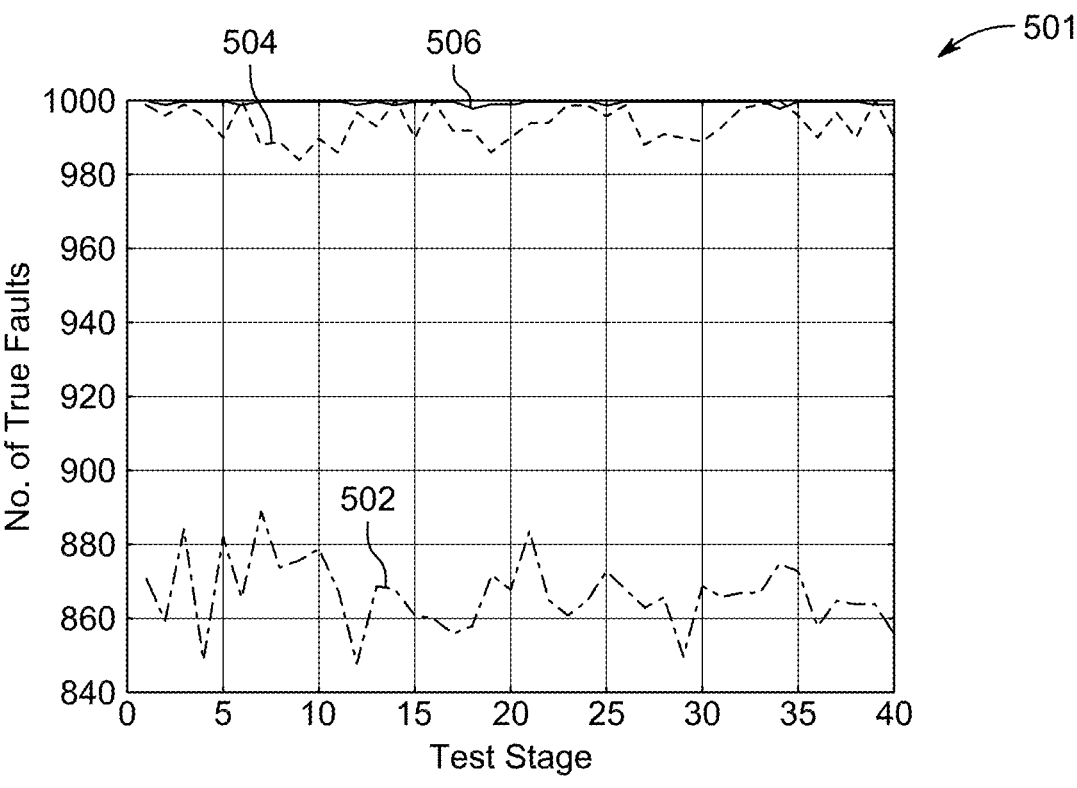
FIG. 5A illustrates a graphical representation of a comparative performance based on true detection in a best-case scenario, according to certain embodiments.
Figure 5B:
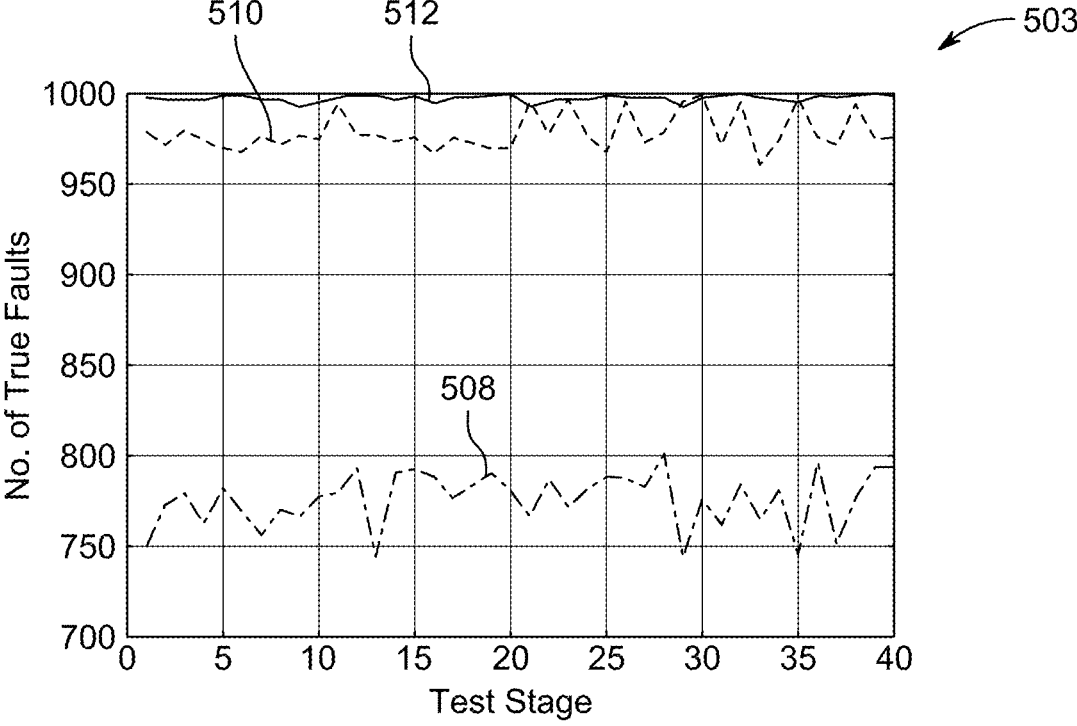
FIG. 5B illustrates a graphical representation of a comparative performance based on true detection in a base-case scenario, according to certain embodiments.
Figure 5C:
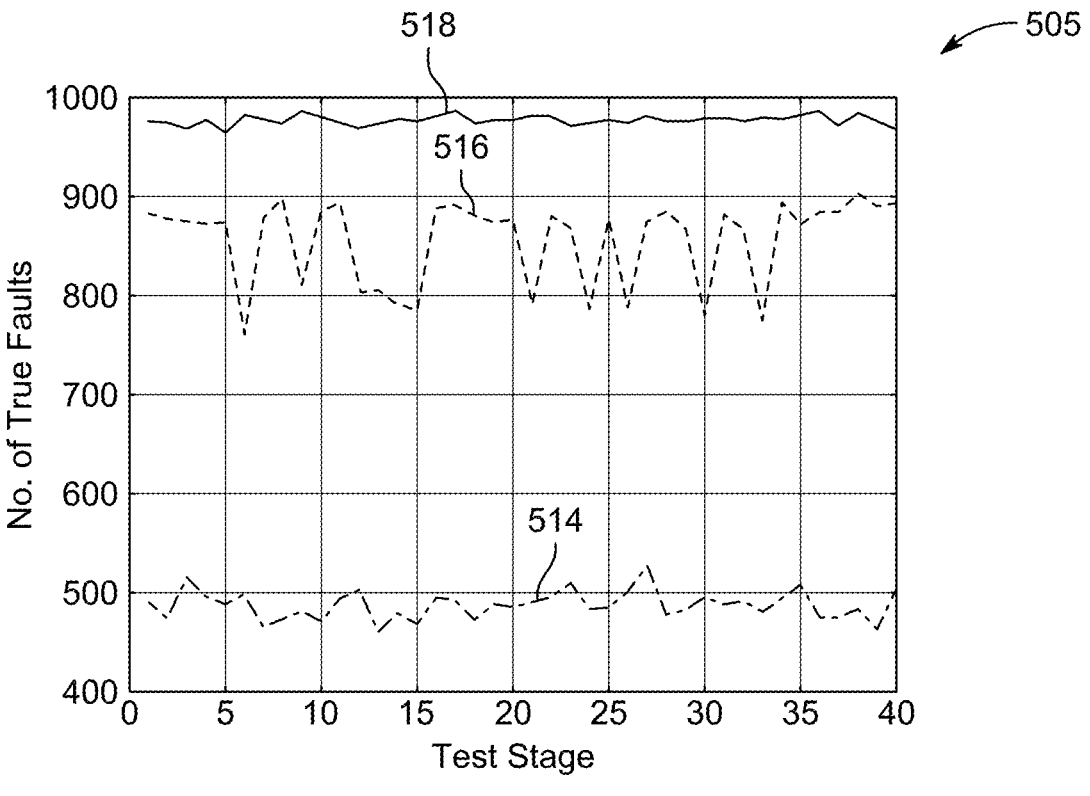
FIG. 5C illustrates a graphical representation of a comparative performance based on true detection in a worst-case scenario, according to certain embodiments.

In the testing process, a total of 40 stages were considered, and each individual stage had a total of 1000 faulted lines. The performance of the true fault detection in the three different scenarios using the conventional, traditional GA, and proposed CGA algorithms is shown in FIG. 5, as summarized in Table XIV. The present disclosure outperforms the existing algorithms in all considered scenarios FIG. 5A-FIG. 5C is a set of three graphs that compare the performance of three different fault detection methods: the Conventional Method, the Traditional Genetic Algorithm (GA) Algorithm, and the proposed Collaborative Genetic Algorithm (CGA) Algorithm, across different scenarios. The x-axis for all graphs represents the "Test Stage." The y-axis for all graphs represents the "No. of True Faults," indicating how many faults were correctly identified out of a total of 1000 faults simulated in each test stage.

FIG. 5A illustrates a graphical representation 501 of a comparative performance based on true detection in a best-case scenario, according to certain embodiments.

The graphical representation 501 illustrates the performance of the three methods under a best-case scenario, where network uncertainties such as communication errors and measurement noise are minimal.

Curve 502: This curve represents the conventional method. The number of true faults detected by this method fluctuates between approximately 850 and 880. This indicates a relatively lower but stable performance, as it fails to correctly identify around 120-150 faults even under ideal conditions.

Curve 504: This curve represents the Traditional GA Algorithm. The number of true faults detected by this method is consistently high, ranging from approximately 980 to 990. This shows a significant improvement over the conventional method, demonstrating the effectiveness of the CGA in optimizing fault detection under nominal conditions.

Curve 506: This curve represents the CGA (Disclosure). The number of true faults detected by this method is consistently at or very near 1000, with a minimal fluctuation. This indicates that the proposed CGA approach achieves a near-perfect fault detection rate, outperforming both the conventional and the traditional GA methods in this best-case scenario.

FIG. 5B illustrates a graphical representation 503 of a comparative performance based on true detection in a base-case scenario, according to certain embodiments The graphical representation 503 shows the performance of the three methods under a base-case scenario, which represents typical, real-world operating conditions with a moderate level of network uncertainty.

Curve 508: This curve represents the Conventional Method. The number of true faults detected has dropped significantly compared to the best-case scenario, fluctuating roughly between 750 and 800. This demonstrates the vulnerability of the conventional method to even moderate network uncertainties.

Curve 510: This curve represents the Traditional GA Algorithm. The performance of this method also shows a slight drop compared to the best-case scenario, with the number of true faults detected fluctuating around 960 to 975. While still performing well, the drop indicates that its accuracy is affected by increased uncertainties.

Curve 512: This curve represents the CGA (Proposed). This method maintains a high level of performance, detecting a number of true faults consistently at or near 1000. It shows minimal degradation from the best-case scenario.

FIG. 5C illustrates a graphical representation 505 of a comparative performance based on true detection in a worst-case scenario, according to certain embodiments.

The graphical representation 505 illustrates the performance of the three methods under a worst-case scenario, where extreme uncertainties such as communication errors, high fault resistance, and relay failures are introduced.

Curve 514: This curve represents the Conventional Method. The number of true faults detected by this method has experienced a dramatic decline, fluctuating around 480 to 520. This indicates that the conventional method is highly unreliable and prone to failure in severe conditions.

Curve 516: This curve represents the Traditional GA Algorithm. The performance of this method shows a significant drop in accuracy, with the number of true faults fluctuating roughly between 775 and 900, over the sampled tests, which indicates susceptibility to the introduced adverse conditions.

Curve 518: This curve represents the CGA (Proposed). Under the same worst-case condition, the CGA maintains a substantially higher and more stable detection count, the measured number of true-fault detections remaining above approximately 980 across the sampled tests. The sustained high detection count and reduced variance indicate that the collaborative mechanisms of the CGA mitigate the impact of the specified uncertainties more effectively than the Conventional Method and the Traditional GA.

Comparison with Alternative Methods

TABLE VIII discloses the weighting factors of line L3 obtained by training the CGA algorithm in the best-case scenario.

| | Line number | | | | | |
| | L1 | L2 | L3 | L4 | L5 | L6 |
| | | | Relay number | | | |
|---|---|---|---|---|---|---|
| | R1, R2 | R3, R4 | R5, R6 | R7, R8 | R9, R10 | R11, R12 |
| Zone 1 $W_3^I$ | 0 | 0 | 0.7322 | 0 | 0 | 0 |
| Zone 1 $W_3^I$ | 0 | 0 | 0.613 | 0 | 0 | 0 |
| Zone 2 $W_3^{II}$ | 0 | 0 | 1.5875 | 0.593 | 0 | 0 |

20

-continued

| | Line number | | | | | |
| | L1 | L2 | L3 | L4 | L5 | L6 |
| | | | Relay number | | | |
|---|---|---|---|---|---|---|
| | R1, R2 | R3, R4 | R5, R6 | R7, R8 | R9, R10 | R11, R12 |
| Zone 2 $W_3^{II}$ | 0 | 0.7938 | 1.643 | 0 | 0 | 0 |
| Zone 3 $W_3^{III}$ | 0.5247 | 0 | 1.8877 | 1.2537 | 0 | 0 |
| Zone 3 $W_3^{III}$ | 0 | 1.3287 | 1.5806 | 0 | 0.2346 | 0 |

TABLE IX discloses the weighting factors of line L3 obtained by training the CGA algorithm in the base case scenario.

| | Line number | | | | | |
| | L1 | L2 | L3 | L4 | L5 | L6 |
| | | | Relay number | | | |
|---|---|---|---|---|---|---|
| | R1, R2 | R3, R4 | R5, R6 | R7, R8 | R9, R10 | R11, R12 |
| Zone 1 $W_3^I$ | 0 | 0 | 0.7415 | 0 | 0 | 0 |
| Zone 1 $W_3^I$ | 0 | 0 | 0.6510 | 0 | 0 | 0 |
| Zone 2 $W_3^{II}$ | 0 | 0 | 1.6687 | 0.6495 | 0 | 0 |
| Zone 2 $W_3^{II}$ | 0 | 0.4314 | 1.4473 | 0 | 0 | 0 |
| Zone 3 $W_3^{III}$ | 0.3009 | 0 | 1.7415 | 1.5687 | 0 | 0 |
| Zone 3 $W_3^{III}$ | 0 | 1.2838 | 1.6569 | 0 | 0.4005 | 0 |

TABLE X discloses the weighting factors of line L3 obtained by training the CGA algorithm in the worst-case scenario.

| | Line number | | | | | |
| | L1 | L2 | L3 | L4 | L5 | L6 |
| | | | Relay number | | | |
|---|---|---|---|---|---|---|
| | R1, R2 | R3, R4 | R5, R6 | R7, R8 | R9, R10 | R11, R12 |
| Zone 1 $W_3^I$ | 0 | 0 | 0.6488 | 0 | 0 | 0 |
| Zone 1 $W_3^I$ | 0 | 0 | 0.6673 | 0 | 0 | 0 |
| Zone 2 $W_3^{II}$ | 0 | 0 | 1.6333 | 0.5173 | 0 | 0 |
| Zone 2 $W_3^{II}$ | 0 | 0.5341 | 1.4616 | 0 | 0 | 0 |
| Zone 3 $W_3^{III}$ | 0.1055 | 0 | 1.7524 | 1.5889 | 0 | 0 |
| Zone 3 $W_3^{III}$ | 0 | 1.5804 | 1.8290 | 0 | 0.2508 | 0 |

TABLE XI discloses the weighting factors of line L3 obtained by training the traditional GA algorithm in the best-case scenario.

| | Line number | | | | | |
| | L1 | L2 | L3 | L4 | L5 | L6 |
| | | | Relay number | | | |
|---|---|---|---|---|---|---|
| | R1, R2 | R3, R4 | R5, R6 | R7, R8 | R9, R10 | R11, R12 |
| Zone 1 $W_3^I$ | 0 | 0 | 0.7485 | 0 | 0 | 0 |
| Zone 1 $W_3^I$ | 0 | 0 | 0.6458 | 0 | 0 | 0 |
| Zone 2 $W_3^{II}$ | 0 | 0 | 1.4653 | 0.6540 | 0 | 0 |
| Zone 2 $W_3^{II}$ | 0 | 0.4086 | 1.4601 | 0 | 0 | 0 |
| Zone 3 $W_3^{III}$ | 0.2046 | 0 | 1.5340 | 1.3994 | 0.5083 | 0 |
| Zone 3 $W_3^{III}$ | 0 | 1.5555 | 1.6727 | 0 | 0.2508 | 0 |

TABLE XII discloses the weighting factors of line L3 obtained by training the traditional GA algorithm in the base-case scenario.

| | Line number | | | | |
|---|---|---|---|---|---|
| L1 | L2 | L3 | L4 | L5 | L6 |
| | | Relay number | | | |
| R1, R2 | R3, R4 | R5, R6 | R7, R8 | R9, R10 | R11, R12 |
| Zone 1 W$_3^I$ 0 | 0 | 0.7883 | 0 | 0 | 0 |
| Zone 1 W$_3^I$ 0 | 0 | 0.7920 | 0 | 0 | 0 |
| *Zone 2 W$_3^{II}$* 0 | 0 | 1.6116 | *0.6122* | 0 | 0 |
| *Zone 2 W$_3^{II}$* 0 | 0.7874 | 1.4552 | 0 | 0 | 0 |
| Zone 3 W$_3^{III}$ 0.3196 | 0 | 1.6100 | *1.1803* | 0 | 0 |
| Zone 3 W$_3^{III}$ 0 | *1.5712* | 1.6222 | 0 | 0.8392 | 0 |

TABLE XIII discloses the weighting factors of line L3 obtained by training the traditional GA algorithm in the worst-case scenario.

| | Line number | | | | |
|---|---|---|---|---|---|
| L1 | L2 | L3 | L4 | L5 | L6 |
| | | Relay number | | | |
| R1, R2 | R3, R4 | R5, R6 | R7, R8 | R9, R10 | R11, R12 |
| Zone 1 W$_3^I$ 0 | 0 | 0.7516 | 0 | 0 | 0 |
| Zone 1 W$_3^I$ 0 | 0 | 0.6321 | 0 | 0 | 0 |
| *Zone 2 W$_3^{II}$* 0 | 0 | 1.4530 | *0.4091* | 0 | 0 |
| *Zone 2 W$_3^{II}$* 0 | 0.4176 | 1.5063 | 0 | 0 | 0 |
| Zone 3 W$_3^{III}$ 0.0669 | 0 | 1.5526 | *1.5427* | 0 | 0 |
| Zone 3 W$_3^{III}$ 0 | *1.5997* | 1.5738 | 0 | 0.3006 | 0 |

TABLE XIV discloses the comparative performance obtained by testing the conventional method, the traditional GA, and the proposed CGA.

| | Scenario | | |
|---|---|---|---|
| Method | Best-case | Base-case | Worst-case |
| Conventional method | 86.69% | 77.66% | 48.84% |
| Traditional GA | 99.91% | 98.71% | 93.46% |
| CGA (present invention) | 99.98% | 99.68% | 98.35% |

Further, the testing process of the traditional GA and the proposed CGA algorithm, two samples of true fault detection were recorded in Table XV, with their related performance matrices D$^{I,II,III}$ shown in Tables XVI and XVII. In the traditional GA algorithm, the faulted line L5 was successfully detected by distance relay R9 only in zone 1 (relay R10 in zone 1 did not respond correctly to complete the detection isolation of cable 5) and by the backup protection relay R10 in zone 3. Observe that there was no response from any backup protection relay in zone 2 against the faulted line L5. For the CGA algorithm, the faulted line L2 was successfully detected by both distance relays R3 and R4 in zone 1 and, as intended, by the backup relay in both zones 2 and 3. Hence, the faulted line decision was successfully made considering the maximum objective function among all the six objective functions, which resulted in the successful isolation of line L5 and line L2 by the GA and CGA algorithms, respectively.

TABLE XV

| | Best-case scenario | |
|---|---|---|
| Method | GA | CGA |
| True detection counter | 965 | 975 |
| Fault Type | φ1 | φ1 |
| Faulted line | L5 | L6 |
| Faulted location | 0.724 | 0.5338 |
| Fault resistance Ω | 0 | 20 |
| Relay failure | — | — |
| Measurement error | −0.0085 | 0.1297 |
| Exchange error | — | — |
| OF(L1) | 0.0385 | 0.2698 |
| OF(L2) | 0.1281 | 0.0049 |
| OF(L3) | 0.0037 | 0.1026 |
| OF(L4) | 0.277 | 0.0055 |
| OF(L5) | 0.8611 | 0.2678 |
| OF(L6) | 0.4104 | 0.8251 |
| Faulted line decision | L5 (true) | L6 (true) |
| Countermeasure | Table XVI | Table XVII |

In Table XVIII, the traditional GA algorithm made a false fault detection on line L3 while the fault was on line L2. In Table XIX, there was a single fault detection by relay R5 in zone 2, which was insufficient to predict the faulted line for proper isolation. If the proposed CGA were used to deal with a similar fault with a single relay detection, such as relay R5 in zone 2 (demonstrated in light highlighted color), this would pretend over the performance matrices D$^{I,II,III}$ the closure of both relays R3 and R4 in both zones 1 and 2 along with relay R2 in zone 2 (demonstrated in dark highlighted color). Now, OF(L$_2$) is the maximum of all the six objective functions when the new performance matrices D$^{I,II,III}$ constructed by the proposed CGA and CPS will judge in favor of faulted line L2. Another incident of the correction mechanism of the proposed CGA occurred when the traditional GA created a false fault detection in the case of detection by two relays, as recorded in Table XX and illustrated in Table XXI.

Table XVI discloses performance matrices of the GA algorithm in the best-case scenario.

| | Line number | | | | |
|---|---|---|---|---|---|
| L1 | L2 | L3 | L4 | L5 | L6 |
| | | Relay number | | | |
| R1, R2 | R3, R4 | R5, R6 | R7, R8 | R9, R10 | R11, R12 |
| Zone 1 W$_3^I$ 0 | 0 | 0 | 0 | 1 | 0 |
| Zone 1 W$_3^I$ 0 | 0 | 0 | 0 | 1 | 0 |
| *Zone 2 W$_3^{II}$* 0 | 0 | 0 | 0 | 1 | 0 |
| *Zone 2 W$_3^{II}$* 0 | 0 | 0 | 0 | 1 | 0 |
| Zone 3 W$_3^{III}$ 0 | 0 | 0 | 0 | 1 | 1 |
| Zone 3 W$_3^{III}$ 0 | 0 | 0 | 1 | 1 | 0 |

Table XVII discloses of performance matrices of the CGA algorithm in the best case scenario (see FIG. 14).

Table XVIII discloses of occurrence of wrong fault detection during testing stage of the traditional GA algorithm and the proposed countermeasure using the CGA algorithm in the best case scenario.

| | Best-case scenario | |
|---|---|---|
| Method | GA (experiment) | CGA (calculated) |
| True detection counter | | 8 |
| Fault Type | | φ1 |
| Faulted line | | L2 |
| Fault resistance Ω | | 20 |

-continued

| | Best-case scenario | |
|---|---|---|
| Method | GA (experiment) | CGA (calculated) |
| Relay failure | — | |
| Measurement error | 0.1428 | |
| Exchange error | R4 | |
| OF(L1) | 0 | 0.1477 |
| OF(L2) | 0.0652 | 0.5816 |
| OF(L3) | 0.1239 | 0.282 |
| OF(L4) | 0 | 0 |
| OF(L5) | 0 | 0 |
| OF(L6) | 0 | 0 |
| Faulted line decision | L3 (false) | L2 (true) |
| Countermeasure | See Table XIX | |

Table XIX discloses of considering the CGA countermeasure when the traditional GA algorithm made a wrong fault detection in the best-case scenario. Backup relays (underlined) belonging to zone 2 sensed the fault and activated other preassigned protection relays, as indicated in the rectangular box (see FIG. 15).

Table XX discloses the occurrence of wrong fault detection during testing stage of the traditional GA algorithm and the proposed countermeasure using the CGA algorithm in the base case scenario.

| | Base-case scenario | |
|---|---|---|
| Method | GA (experiment) | CGA (calculated) |
| True detection counter | 20 | |
| Fault Type | φ1 | |
| Faulted line | L1 | |
| Faulted location | 0.7618 | |
| Fault resistance Ω | 70 | |
| Relay failure | — | |
| Measurement error | 0.2422 | |
| Exchange error | — | |
| OF(L1) | 0.1455 | 0.885 |
| OF(L2) | 0.1288 | 0.4507 |
| OF(L3) | 0 | 0.0746 |
| OF(L4) | 0.1592 | 0.2182 |
| OF(L5) | 0 | 0.0945 |
| OF(L6) | 0.0994 | 0.3404 |
| Faulted line decision | L6 (false) | L1 (true) |
| Countermeasure | See Table XXI | |

Table XXI discloses the consideration of the CGA countermeasure when the GA algorithm made a wrong fault detection in the base-case scenario. Backup relays (underlined) belonging to zone 2 and zone 3 sensed the fault and activated other preassigned protection relays, as indicated in the rectangular box (see FIG. 16).

Finally, all the probability distributions for the base-case scenario that were adopted during the learning and testing processes can be found in FIGS. 6 (A-G), in accordance with Table III and the specifications provided in Table IX.

Figure 6A:
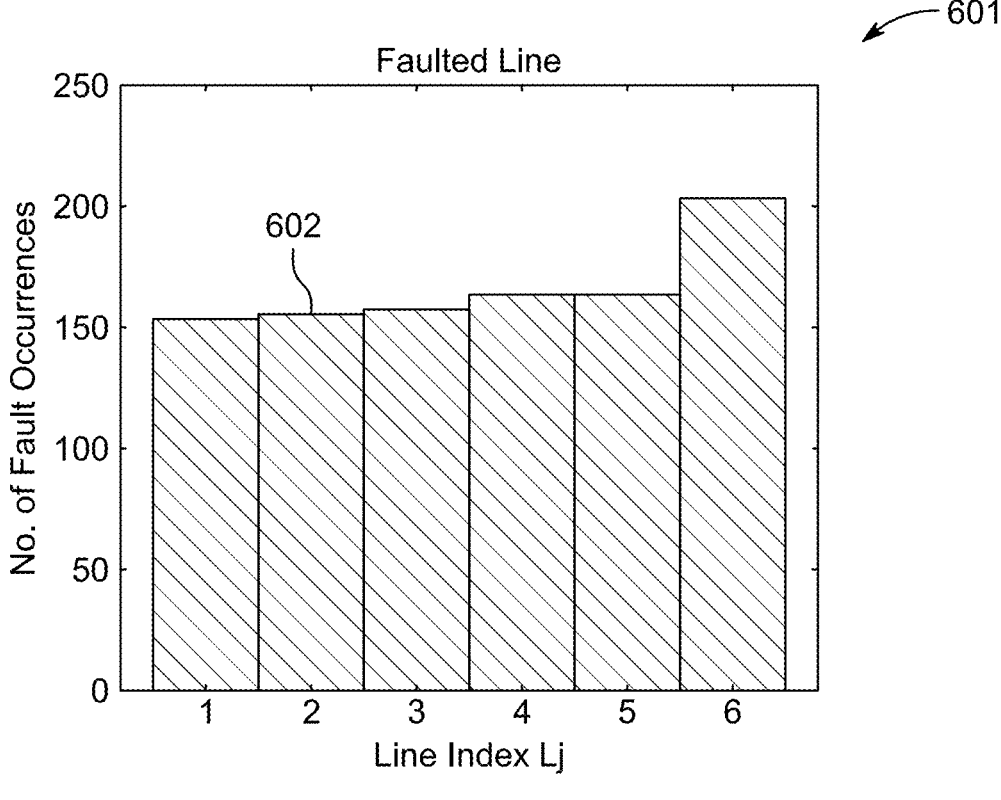
FIG. 6A illustrates a graphical representation of a faulted line Lj in 1000 sample tests, according to certain embodiments.

FIG. 6A illustrates a graphical representation 601 of a faulted line Lj in 1000 sample tests, where the individual bars are indicated as 602. The x-axis, "Line index Lj," represents the different transmission lines, from 1 to 6. The number of fault occurrences is fairly uniform for lines 1 through 5, with each line experiencing around 150 to 160 faults. This indicates that these lines have a similar probability of experiencing a fault. However, Line 6 shows a notably higher number of fault occurrences, reaching just over 200. This suggests that the simulation was designed to have a higher probability of faults occurring on Line 6, which could be a way to test the performance under a more challenging, asymmetric load or topology.

Figure 6B:
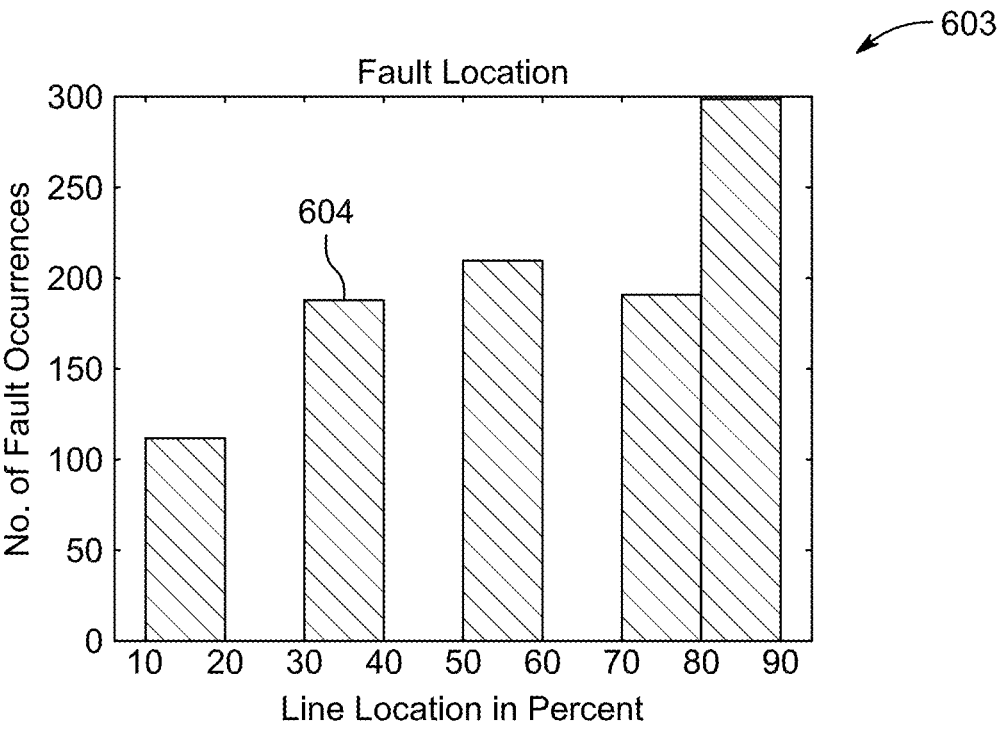
FIG. 6B illustrates a graphical representation of a faulted location, according to certain embodiments.

FIG. 6B illustrates a graphical representation 603 of a faulted location, where the individual bars are indicated as 604. The x-axis, "Fault location in percent," divides the length of a line into segments (e.g., 10%, 20%, 30%, etc.). The histogram shows that faults are not uniformly distributed along the length of the lines. There is a lower number of faults near the beginning of the lines (10% to 20% range) and a significantly higher number of faults towards the end of the lines (80% to 90% range), where the number of occurrences peaks at around 300. This non-uniform distribution of faults could be a feature of the simulation setup, mimicking a scenario where certain locations on the lines are more susceptible to faults than others, possibly due to environmental factors or line characteristics.

Figure 6C:
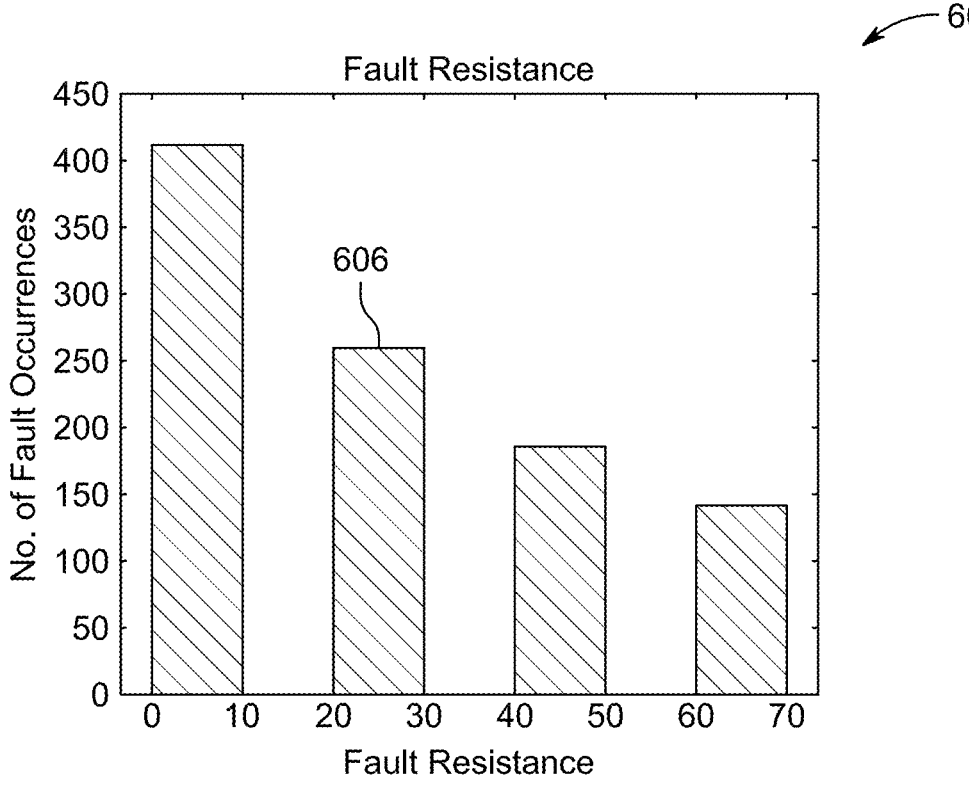
FIG. 6C illustrates a graphical representation of a fault resistance, according to certain embodiments.

FIG. 6C illustrates a graphical representation 605 of a fault resistance, where the individual bars are indicated as 606. The x-axis, "Fault resistance," is a measure of the resistance at the fault point, which can affect the severity and detectability of the fault. The graph shows a non-uniform distribution. Faults with a resistance of 0Ω are the most common, with over 400 occurrences. As the resistance increases to 20Ω and 40Ω, the number of fault occurrences decreases. The least number of faults, around 150, occurred at a resistance of 70Ω. This distribution suggests that the simulation was set up to test the system's ability to handle faults with varying severity, with a higher prevalence of bolted (0Ω) faults.

Figure 6D:
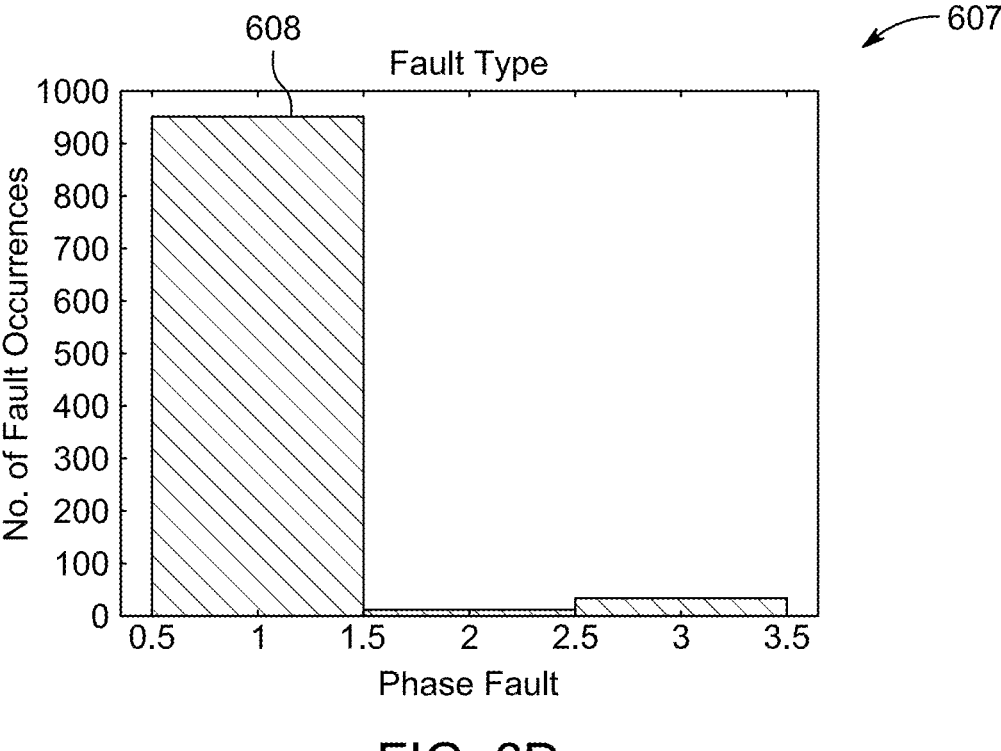
FIG. 6D illustrates a graphical representation of a fault type, according to certain embodiments.

FIG. 6D illustrates a graphical representation 607 of a fault type, where the individual bars are indicated as 608. The x-axis, "Phase Fault," categorizes the faults by type. The graph clearly shows a large imbalance. The vast majority of faults (over 900) are of one type (labeled 1.5 on the x-axis, likely representing a single-phase-to-ground fault, which is the most common type in real-world systems). The other fault types (labeled 2.5 and 3.5, likely representing phase-to-phase and three-phase faults, respectively) have a very low number of occurrences, barely visible on the scale of the graph.

Figure 6E:
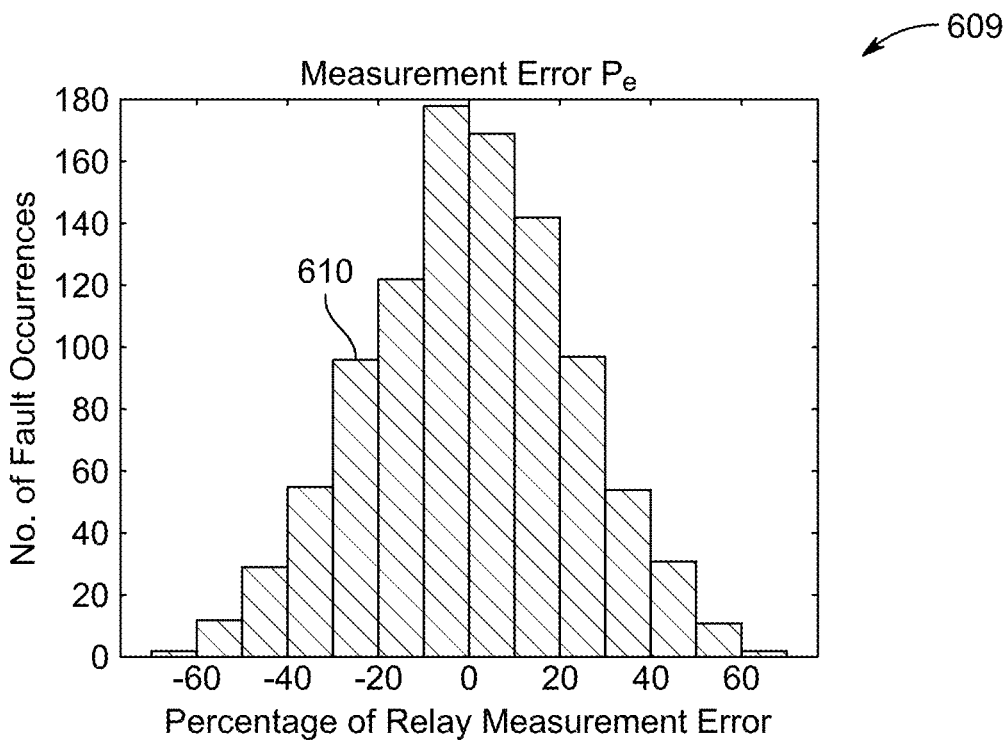
FIG. 6E illustrates a graphical representation of a measurement error, according to certain embodiments.

FIG. 6E illustrates a graphical representation 609 of a measurement error, where the individual bars are indicated as 610. The x-axis, "Percentage of relay measurement error," represents the deviation of the measured value from the true value. The y-axis, "No. of Fault Occurrences," shows the frequency of a given error percentage. The distribution is a bell-shaped curve, which is characteristic of a normal distribution. The highest number of occurrences, around 175, is centered near the 0% error mark, indicating that most measurements are highly accurate. As the measurement error percentage increases in either the positive or negative direction, the frequency of occurrences decreases, which is an expected behavior for random measurement noise in a system.

Figure 6F:
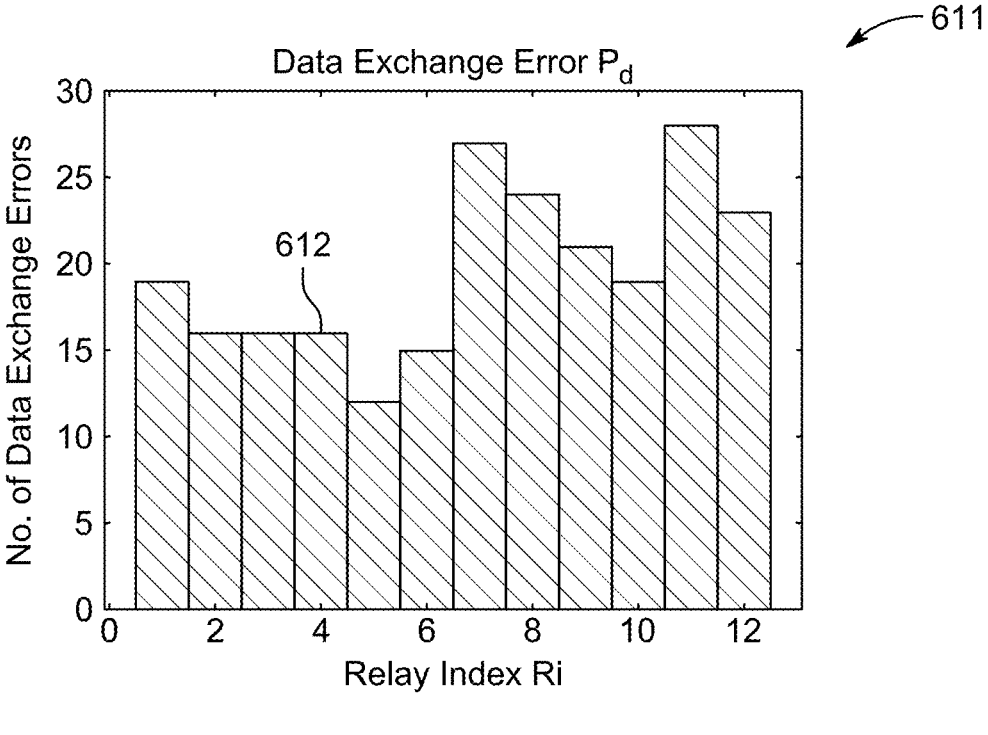
FIG. 6F illustrates a graphical representation of a data exchange error, according to certain embodiments.

FIG. 6F illustrates a graphical representation 611 of a data exchange error, where the individual bars are indicated as 612. The x-axis, "Relay index Ri," represents the 12 relays in the system. The y-axis, "No. of Data Exchange Errors," indicates the number of times a data exchange error occurred for a specific relay. Unlike the previous graphs, this distribution is not uniform or normal. Some relays, like R8 and R11, have a high number of data exchange errors, around 28 to 30. Conversely, relays like R5 and R6 have a very low number of errors, around 12.

Figure 6G:
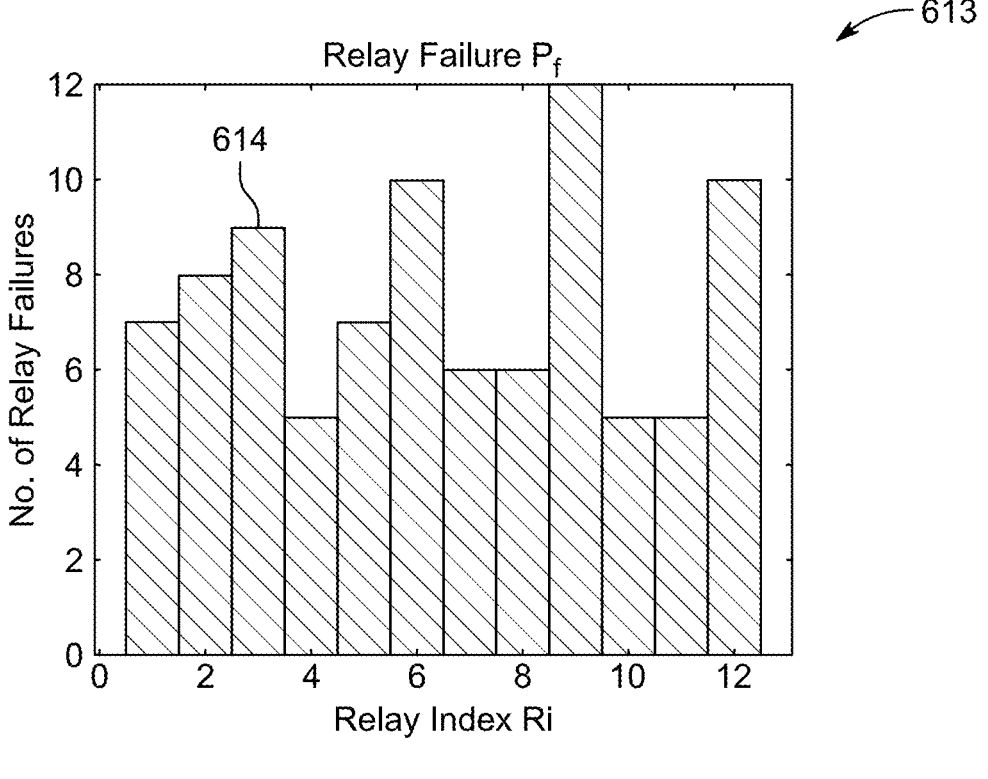
FIG. 6G illustrates a graphical representation of a relay failure, according to certain embodiments.

FIG. 6G illustrates a graphical representation 613 of a relay failure, where the individual bars are indicated as 614. The x-axis, "Relay index Ri," represents the individual relays. The y-axis, "No. of Relay Failures," indicates how many times each relay failed during the simulation. The distribution of failures is not uniform across the relays. While some relays have a low number of failures (e.g., R4 with 5 failures and R9 with 5 failures), others have a significantly higher number. Notably, Relay R9 experienced the highest number of failures, reaching a total of 12. This non-uniform distribution suggests that the simulation was specifically designed to test the system's resilience to failures in key or less reliable components, mimicking a real-world scenario where certain devices may be more prone to failure than others.

The technical advancement of the present disclosure resides in the development of a collaborative protection mask integrated with a CGA-based optimization framework that coordinates protection relays across multiple zones in a wide-area protection system. The present disclosure enables detection by a single relay to propagate fault detection states to paired relays within the same zone and to relays in interconnected zones, thereby establishing collaborative enforcement of detection states. This coordination maximizes the global objective function of fault detection, achieves higher accuracy in faulted line identification, and mitigates the risk of operation failure due to individual relay malfunctions or communication errors. The present disclosure further advances the state of the art by providing a scalable and adaptive protection methodology suitable for evolving power transmission networks, including systems with significant penetration of inverter-based resources and complex transmission line configurations.

Figure 7:
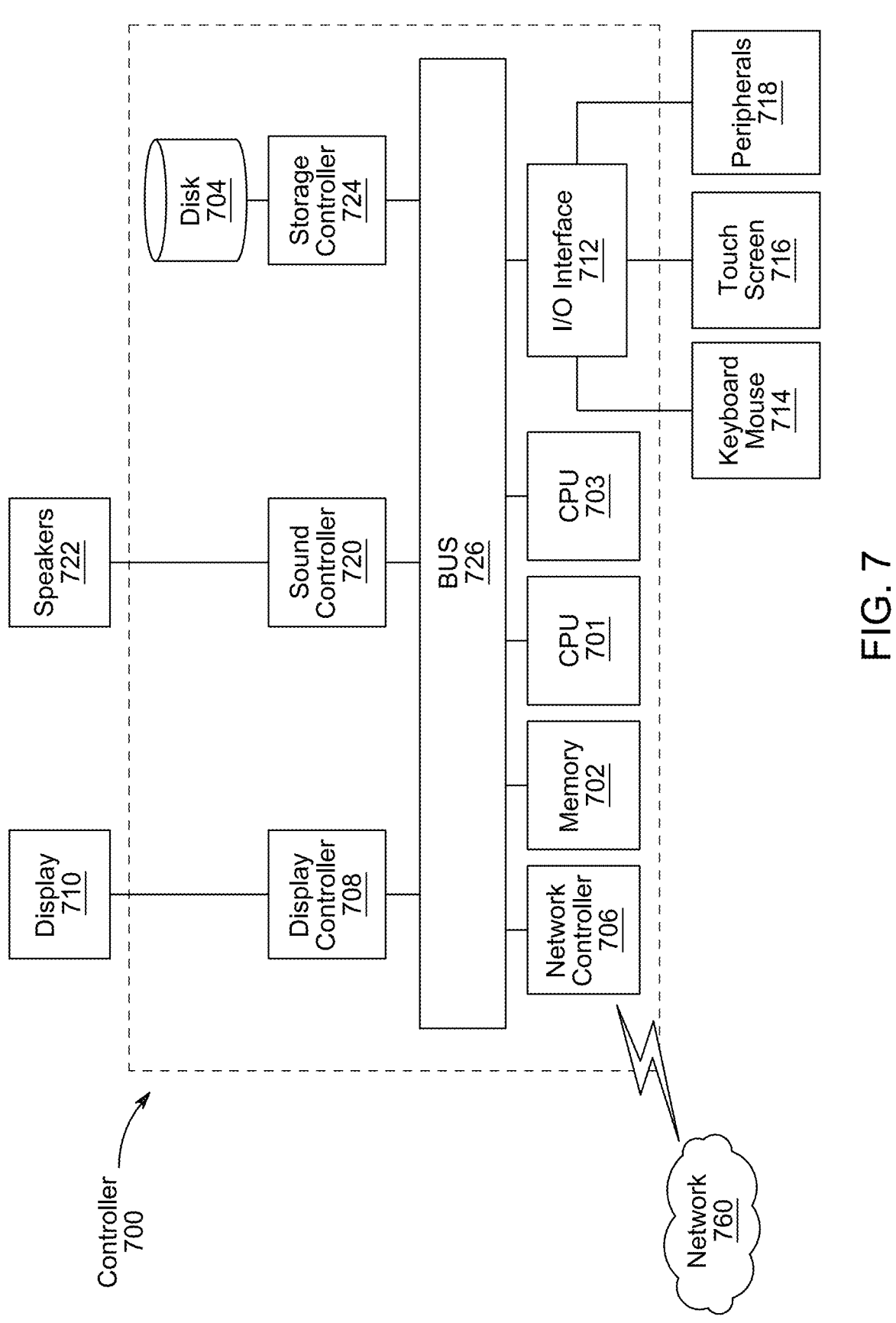
FIG. 7 is an illustration of a non-limiting example of details of computing hardware used in a computing system, according to certain embodiments.

Next, further details of the hardware description of the computing environment of FIG. 2 according to exemplary embodiments are described with reference to FIG. 7. In FIG. 7, a controller is described in which the controller is a computing device which includes a CPU 701 which performs the processes described above/below. The process data and instructions may be stored in memory 702. These processes and instructions may also be stored on a storage medium disk 704 such as a hard drive (HDD) or portable storage medium or may be stored remotely.

Further, the present disclosure is not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the present disclosure may be provided as a utility application, background daemon, or component of an operating system, or combination thereof, executing in conjunction with CPU 701, 703 and an operating system such as Microsoft Windows 7, Microsoft Windows 10, UNIX, LINUX, Apple MAC-OS and other systems known to those skilled in the art.

The hardware elements in order to achieve the computing device may be realized by various circuitry elements, known to those skilled in the art. For example, CPU 701 or CPU 703 may be a Xenon or Core processor from Intel of America or an Opteron processor from AMD of America, or may be other processor types that would be recognized by one of ordinary skill in the art. Alternatively, the CPU 701, 703 may be implemented on an FPGA, ASIC, PLD or using discrete logic circuits, as one of ordinary skilled in the art would recognize. Further, CPU 701, 703 may be implemented as multiple processors cooperatively working in parallel to perform the instructions of the inventive processes described above.

The computing device in FIG. 7 also includes a network controller 706, such as an Intel Ethernet PRO network interface card from Intel Corporation of America, for interfacing with network 760. As can be appreciated, the network 760 can be a public network, such as the Internet, or a private network such as an LAN or WAN network, or any combination thereof and can also include PSTN or ISDN subnetworks. The network 760 can also be wired, such as an Ethernet network, or can be wireless such as a cellular network including EDGE, 3G and 4G wireless cellular systems. The wireless network can also be WiFi, Bluetooth, or any other wireless form of communication that is known.

The computing device further includes a display controller 708, such as a NVIDIA GeForce GTX or Quadro graphics adaptor from NVIDIA Corporation of America for interfacing with display 710, such as a Hewlett Packard HPL2445w LCD monitor. A general purpose I/O interface 712 interfaces with a keyboard and/or mouse 714 as well as a touch screen panel 716 on or separate from display 710. General purpose I/O interface also connects to a variety of peripherals 718 including printers and scanners, such as an OfficeJet or DeskJet from Hewlett Packard.

A sound controller 720 is also provided in the computing device such as Sound Blaster X-Fi Titanium from Creative, to interface with speakers/microphone 722 thereby providing sounds and/or music.

The general-purpose storage controller 724 connects the storage medium disk 704 with communication bus 726, which may be an ISA, EISA, VESA, PCI, or similar, for interconnecting all of the components of the computing device. A description of the general features and functionality of the display 710, keyboard and/or mouse 714, as well as the display controller 708, storage controller 724, network controller 706, sound controller 720, and general purpose I/O interface 712 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 7.

Figure 8:
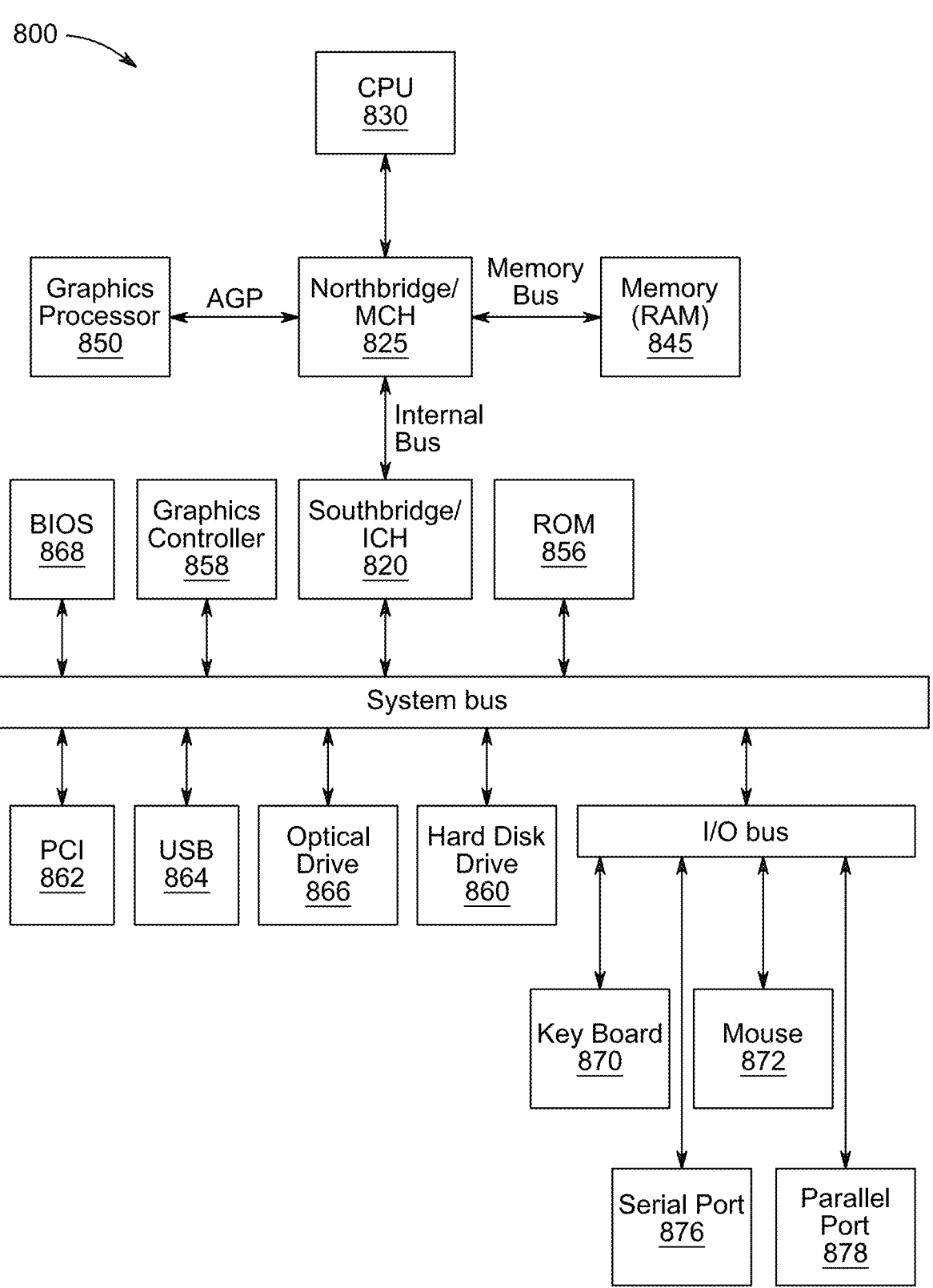
FIG. 8 is an exemplary schematic diagram of a data processing system used within the computing system, according to certain embodiments.

FIG. 8 shows a schematic diagram of a data processing system, according to certain embodiments, for performing the functions of the exemplary embodiments. The data processing system is an example of a computer in which code or instructions implementing the processes of the illustrative embodiments may be located.

In FIG. 8, data processing system 800 employs a hub architecture including a north bridge and memory controller hub (NB/MCH) 885 and a south bridge and input/output (I/O) controller hub (SB/ICH) 880. The central processing unit (CPU) 830 is connected to NB/MCH 885. The NB/MCH 885 also connects to the memory 845 via a memory bus and connects to the graphics processor 850 via an accelerated graphics port (AGP). The NB/MCH 885 also connects to the SB/ICH 880 via an internal bus (e.g., a unified media interface or a direct media interface). The central processing unit (CPU) 830 may contain one or more processors and even may be implemented using one or more heterogeneous processor systems.

Figure 9:
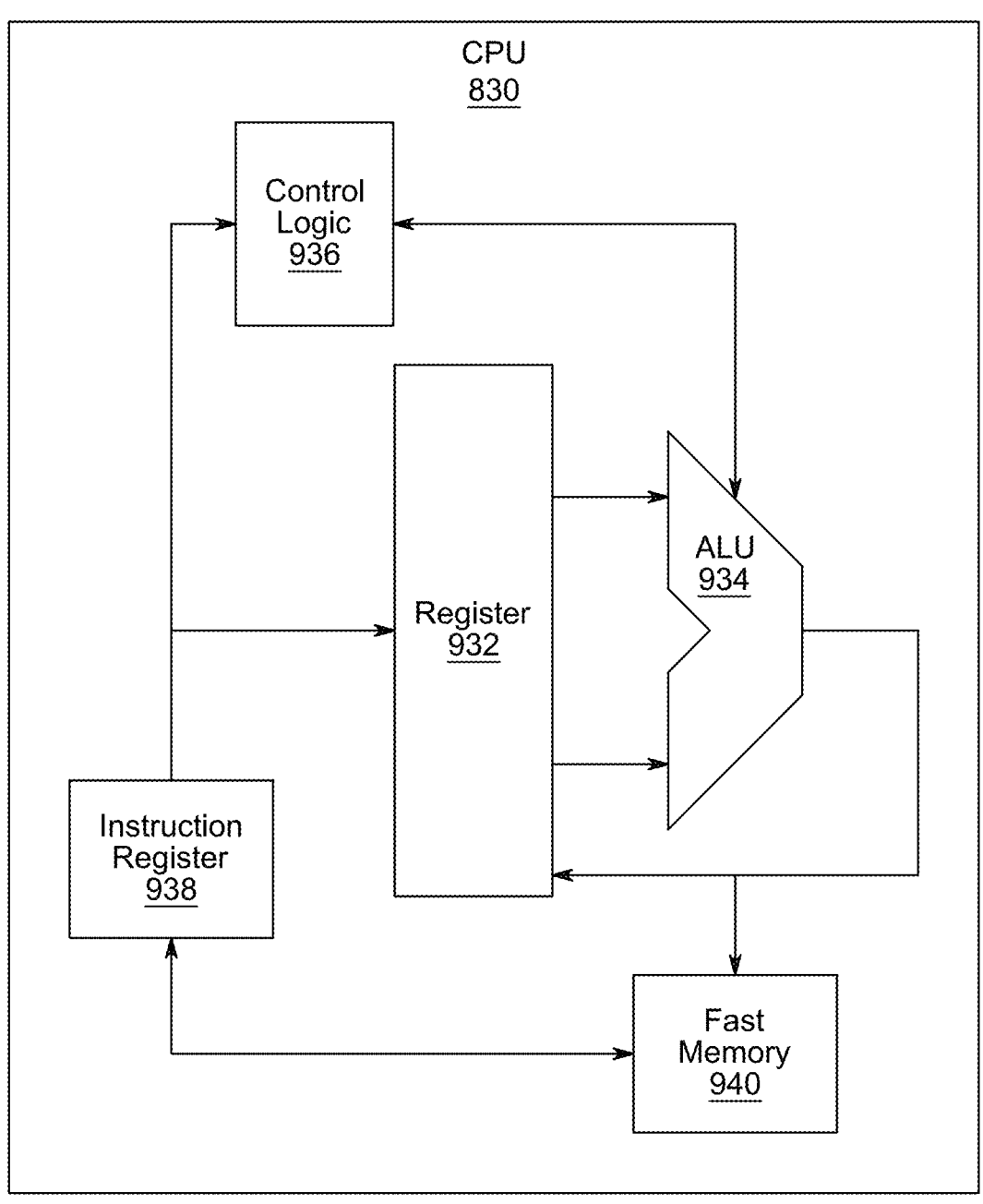
FIG. 9 is an exemplary schematic diagram of a processor used with the computing system, according to certain embodiments.

For example, FIG. 9 shows one implementation of CPU 830. In one implementation, the instruction register 982 retrieves instructions from the fast memory 940. At least part of these instructions is fetched from the instruction register 982 by the control logic 986 and interpreted according to the instruction set architecture of the CPU 930. Part of the instructions can also be directed to the register 982. In one implementation the instructions are decoded according to a hardwired method, and in another implementation the instructions are decoded according to a microprogram that translates instructions into sets of CPU configuration signals that are applied sequentially over multiple clock pulses. After fetching and decoding the instructions, the instructions are executed using the arithmetic logic unit (ALU) 984 that loads values from the register 982 and performs logical and mathematical operations on the loaded values according to the instructions. The results from these operations can be feedback into the register and/or stored in the fast memory 940. According to certain implementations, the instruction set architecture of the CPU 830 can use a reduced instruction set architecture, a complex instruction set architecture, a vector processor architecture, a very large instruction word architecture. Furthermore, the CPU 830 can be based on the Von Neuman model or the Harvard model. The CPU 830 can be a digital signal processor, an FPGA, an ASIC, a PLA, a PLD, or a CPLD. Further, the CPU 830 can be an x56 processor by Intel or by AMD, an ARM processor, a Power architecture processor by, e.g., IBM; a SPARC architecture processor by Sun Microsystems or by Oracle; or other known CPU architecture.

Referring again to FIG. 8, the data processing system 800 can include that the SB/ICH 880 is coupled through a system bus to an I/O Bus, a read only memory (ROM) 856, universal serial bus (USB) port 864, a flash binary input/output system (BIOS) 868, and a graphics controller 858. PCI/PCIe devices can also be coupled to SB/ICH 880 through a PCI bus 862.

The PCI devices may include, for example, Ethernet adapters, add-in cards, and PC cards for notebook computers. The Hard disk drive 860 and CD-ROM666 can use, for example, an integrated drive electronics (IDE) or serial advanced technology attachment (SATA) interface. In one implementation the I/O bus can include a super I/O (SIO) device.

Further, the hard disk drive (HDD) 860 and optical drive 866 can also be coupled to the SB/ICH 880 through a system bus. In one implementation, a keyboard 870, a mouse 872, a parallel port 878, and a serial port 876 can be connected to the system bus through the I/O bus. Other peripherals and devices that can be connected to the SB/ICH 880 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry or based on the requirements of the intended back-up load to be powered.

Figure 10:
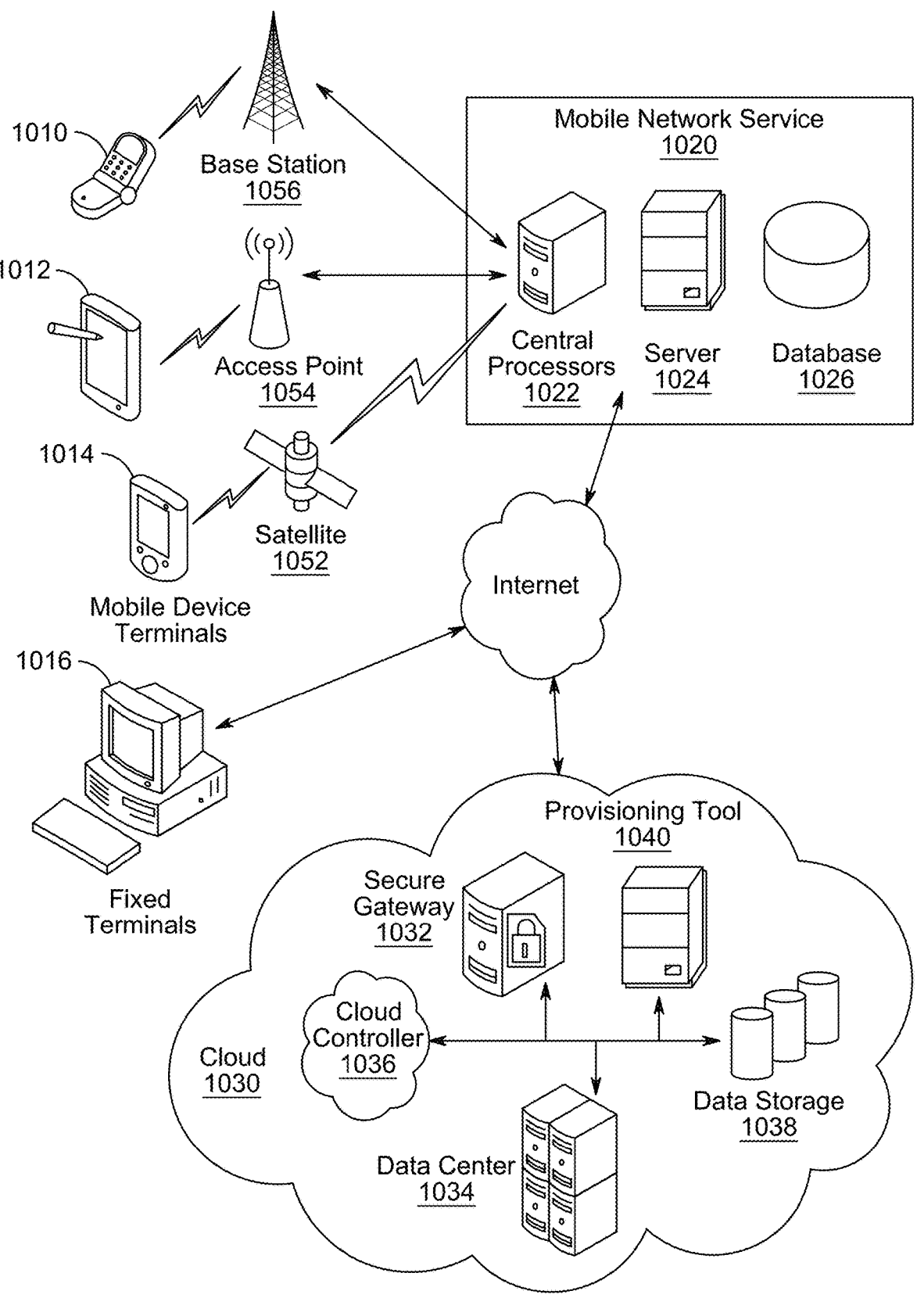
FIG. 10 is an illustration of a non-limiting example of distributed components which may share processing with a controller, according to certain embodiments.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 10, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely, either in real-time or as a batch process. Additionally, some aspects of the present disclosures may be performed on modules or hardware not identical to those described. Accordingly, other aspects of the present disclosures are within the scope that may be claimed. More specifically, FIG. 10 illustrates client devices including smart phone 1011, tablet 1012, mobile device terminal 1014 and fixed terminals 1016. These client devices may be commutatively coupled with a mobile network service 1020 via base station 1056, access point 1054, satellite 1052 or via an internet connection. Mobile network service 1020 may comprise central processors 1022, server 1024 and database 1026. Fixed terminals 1016 and mobile network service 1020 may be commutatively coupled via an internet connection to functions in cloud 1030 that may comprise security gateway 1032, data center 1034, cloud controller 1036, data storage 1038 and provisioning tool 1040.

The above-described hardware description is a non-limiting example of corresponding structure for performing the functionality described herein.

Obviously, numerous modifications and variations of the present disclosure are possible in light of the above teachings. It is therefore to be understood that within the scope of the appended claims, the invention may be practiced otherwise than as specifically described herein.

The invention claimed is:

1. A method for collaborative protection mask for a wide area protection, comprising:

determining if a first pair of protection relays (R5 R6) in a first zone detects an occurrence of one fault for a first line (L3) from a first activation mask (activation mask D$^I$) based on a first weighing factor for the first pair of protection relays in the first zone;

determining if the first pair of protection relays in the first zone detects the occurrence of the one fault for the first line from a second activation mask (activation mask D$^{II}$) based on a second weighing factor for the first pair of protection relays in the first zone;

determining if a second pair of protection relays (R3 R8) in a second zone detects the occurrence of the one fault for the first line from the second activation mask (activation mask D$^{II}$) based on a second weighing factor for the for the second pair of protection relays in the second zone;

determining if the first pair of protection relays in the first zone detects the occurrence of the one fault for the first line from a third activation mask (activation mask D$^{III}$) based on a third weighing factor for the first pair of protection relays in the first zone;

determining if the second pair of protection relays (R3 R8) in the second zone detects the occurrence of the one fault for the first line from the third activation mask (activation mask D$^{III}$) based on the third weighing factor for the for the second pair of protection relays in the second zone;

determining if a third pair of protection relays (R1 R10) in a third zone detects the occurrence of the one fault for the first line from the third activation mask (activation mask D$^{III}$) based on the third weighing factor for the for the third pair of protection relays in the third zone; and perform one or more operations on the first pair of protection relays based on the determinations, the second pair of protection relays, and the third pair of protection relays in their respective zones.

2. The method of claim 1, wherein the one or more operations includes activating, closing, or reclosing, over a first performance matrix, the first pair of protection relays for the first zone after the first pair of protection relays (R5 R6) in a first zone is determined to detect the occurrence of one fault for a first line (L3) from a first activation mask (activation mask D$^I$) based on a first weighing factor for the first pair of protection relays in the first zone.

3. The method of claim 1, wherein the one or more operations includes activating, closing, or reclosing, over a second performance matrix, the first pair of protection relays for the first zone after the first pair of protection relays in the first zone is determined to detect the occurrence of the one fault for the first line from a second activation mask (activation mask D$^{II}$) based on a second weighing factor for the for the first pair of protection relays in the first zone.

4. The method of claim 1, wherein the one or more operations includes activating, closing, or reclosing, over a first performance matrix, the first pair of protection relays for the first zone after the first pair of protection relays in the first zone is determined to detect the occurrence of the one fault for the first line from a second activation mask (activation mask D$^{II}$) based on a second weighing factor for the first pair of protection relays in the first zone.

5. The method of claim 1, wherein the one or more operations includes activating, closing, or reclosing, over a second performance matrix, the second pair of protection relays for the second zone after the second pair of protection relays in the second zone is determined to detect the occurrence of the one fault for the first line from the second activation mask (activation mask D$^{II}$) based on a second weighing factor for the for the second pair of protection relays in the second zone.

6. The method of claim 1, wherein the one or more operations includes activating, closing, or reclosing, over a second performance matrix, the first pair of protection relays for the first zone after the second pair of protection relays in the second zone is determined to detect the occurrence of the one fault for the first line from the second activation mask (activation mask D$^{II}$) based on a second weighing factor for the for the second pair of protection relays in the second zone.

7. The method of claim 1, wherein the one or more operations includes activating, closing, or reclosing, over a first performance matrix, the first pair of protection relays for the first zone after the second pair of protection relays in the second zone is determined to detect the occurrence of the one fault for the first line from the second activation mask (activation mask D$^{II}$) based on a second weighing factor for the for the second pair of protection relays in the second zone.

8. The method of claim 1, wherein the one or more operations includes activating, closing, or reclosing, over a third performance matrix, the first pair of protection relays for the first zone after the first pair of protection relays in the first zone is determined to detect the occurrence of the one fault for the first line from the third activation mask (activation mask D$^{III}$) based on a third weighing factor for the for the first pair of protection relays in the first zone.

9. The method of claim 1, wherein the one or more operations includes activating, closing, or reclosing, over a second performance matrix, the first pair of protection relays for the first zone after the first pair of protection relays in the first zone is determined to detect the occurrence of the one fault for the first line from the third activation mask (activation mask D$^{III}$) based on a third weighing factor for the for the first pair of protection relays in the first zone.

10. The method of claim 1, wherein the one or more operations includes activating, closing, or reclosing, over a first performance matrix, the first pair of protection relays for the first zone after the first pair of protection relays in the first zone is determined to detect the occurrence of the one fault for the first line from the third activation mask (activation mask D$^{III}$) based on a third weighing factor for the for the first pair of protection relays in the first zone.

11. The method of claim 1, wherein the one or more operations includes:

after the first pair of protection relays in the first zone is determined to detect the occurrence of the one fault for the first line from the third activation mask (activation mask D$^{III}$) based on a third weighing factor for the for the first pair of protection relays in the first zone, activating, closing, or reclosing the second pair of protection relays for the second zone over a third performance matrix;

the first pair of protection relays for the first zone over the third performance matrix;

the second pair of protection relays for the second zone over a second performance matrix;

the first pair of protection relays for the first zone over the second performance matrix; and the first pair of protection relays for the first zone over a first performance matrix.

12. The method of claim 1, wherein the one or more operations includes:

after the third pair of protection relays in the third zone is determined to detect the occurrence of the one fault for the first line from the third activation mask (activation mask D$^{III}$) based on a third weighing factor for the for the third pair of protection relays in the third zone, activating, closing, or reclosing the third pair of protection relays for the third zone over a third performance matrix;

the second pair of protection relays for the second zone over the third performance matrix;

the first pair of protection relays for the first zone over the third performance matrix;

the second pair of protection relays for the second zone over a second performance matrix;

the first pair of protection relays for the first zone over the second performance matrix; and the first pair of protection relays for the first zone over a first performance matrix.

13. A collaborative protection mask for a wide area protection system, comprising:

a first pair of protection relays (R5, R6) are positioned in a first zone (zone 1), over a first performance matrix, a second performance matrix, and a third performance matrix, configured to detect an occurrence of one fault for a first line from one or more activation masks based on one or more weighting factor for the first pair of protection relays in the first zone, a second pair of protection relays (R3, R8) are positioned in a second zone (zone 2), over the second performance matrix and the third performance matrix, configured to detect the occurrence of one fault for the first line from one or more activation masks based on one or more weighting factor for the second pair of protection relays in the second zone, and a third pair of protection relays (R1, R10) are positioned in a third zone (zone 3), over the third performance matrix, configured to detect the occurrence of one fault for the first line from one or more activation masks based on one or more weighting factor for the third pair of protection relays in the third zone.

14. The collaborative protection mask of claim 13, wherein the first pair of protection relays are configured to create immediate collaborative protection among relays of the first pair of protection relays.

15. The collaborative protection mask of claim 13, wherein, in response to non-detection of a fault by the first pair of protection relays, the first pair of protection relays simulate a fault detection by a line processing unit communication packet and a cyber physical system communication packet.

16. The collaborative protection mask of claim 13, wherein the line processing unit communication packet and the cyber physical system communication packet are initiated by the first pair of protection relays, and in response to detection of a fault by the first pair of protection relays, the first pair of protection relays enable fault detection by a line processing unit communication packet and a cyber physical system communication packet initiated by another first pair of protection relays.

17. The collaborative protection mask of claim 13, wherein the second pair of protection relays are configured to create an immediate collaborative protection among relays of the second pair of protection relays, and in response to detection of a fault by the first and the second pairs of protection relays, the first and the second pairs of protection relays enable fault detection by a line processing unit communication packet and a cyber physical system communication packet initiated by the second pair of protection relays.

18. The collaborative protection mask of claim 13, wherein the third pair of protection relays are configured to create an immediate collaborative protection among relays of the third pair of protection relays.

19. The collaborative protection mask of claim 13, further comprises one or more operations, wherein the one or more operations include:

after the first pair of protection relays in a first zone is determined to detect the occurrence of the one fault for the first line from a third activation mask (activation mask $D^{III}$) based on a weighing factor for the for the first pair of protection relays in the first zone, activating, closing, or reclosing the second pair of protection relays for a second zone over a third performance matrix;

the first pair of protection relays for the first zone over the third performance matrix;

the second pair of protection relays for the second zone over a second performance matrix;

the first pair of protection relays for the first zone over the second performance matrix; and the first pair of protection relays for the first zone over a first performance matrix.

20. The collaborative protection mask of claim 13, wherein the one or more operations include:

after the third pair of protection relays in the third zone is determined to detect the occurrence of the one fault for the first line from the third activation mask (activation mask $D^{III}$) based on a weighing factor for the for the third pair of protection relays in the third zone, activating, closing, or reclosing the third pair of protection relays for the third zone over a third performance matrix;

the second pair of protection relays for the second zone over the third performance matrix;

the first pair of protection relays for the first zone over the third performance matrix;

the second pair of protection relays for the second zone over a second performance matrix;

the first pair of protection relays for the first zone over the second performance matrix; and the first pair of protection relays for the first zone over a first performance matrix.

*     *     *     *     *